(12) United States Patent
Wingate et al.

(10) Patent No.: US 7,841,287 B2
(45) Date of Patent: Nov. 30, 2010

(54) ANCHORING SYSTEM AND METHOD

(76) Inventors: John R. Wingate, 2113 Willow Wisp, Dr., Seabrook, TX (US) 77586; Glenda R. Wingate, 541 Keith St., Pasadena, TX (US) 77504; D. Hardy Johnson, 29 Lakeview Village, Montgomery, TX (US) 77356

( * ) Notice: Subject to any disclaimer, the term of this patent is extended or adjusted under 35 U.S.C. 154(b) by 251 days.

(21) Appl. No.: 12/082,748

(22) Filed: Apr. 14, 2008

(65) Prior Publication Data

US 2008/0257999 A1      Oct. 23, 2008

Related U.S. Application Data

(63) Continuation-in-part of application No. 11/378,603, filed on Mar. 16, 2006, now Pat. No. 7,690,319.

(60) Provisional application No. 60/662,499, filed on Mar. 16, 2005.

(51) Int. Cl.
*B63B 21/00* (2006.01)
(52) U.S. Cl. .................................................. 114/230.2
(58) Field of Classification Search ............. 114/230.2, 114/254; 441/28
See application file for complete search history.

(56) References Cited

U.S. PATENT DOCUMENTS

| | | | | |
|---|---|---|---|---|
| 2,979,576 | A * | 4/1961 | Huber | 191/12.4 |
| 3,851,613 | A * | 12/1974 | Armour | 114/230.23 |
| 4,635,773 | A * | 1/1987 | Llewellin | 192/46 |
| 5,273,468 | A * | 12/1993 | Nichols | 441/6 |
| 5,766,049 | A * | 6/1998 | Letourneau | 441/16 |
| 6,273,017 | B1 * | 8/2001 | Griffin | 114/230.25 |

* cited by examiner

*Primary Examiner*—Stephen Avila
(74) *Attorney, Agent, or Firm*—The Matthews Firm

(57) ABSTRACT

An apparatus for docking and/or mooring vehicles, particularly watercraft and for restraining loads in truck beds or trailers. The apparatus utilizes ropes or cables in housing unit that provides for the extension and retraction of the rope or cables preferably without the need of electrical or manual cranks. The housings are adaptable to be mounted on the vehicle or at an attachment or docking location and are biased to retract but may contain stops or cleats for manually tying off and thus stopping the extension or retraction of the rope or cable. The housings may be further adapted to be flush mounted in relation to surrounding surfaces or to contain lights.

21 Claims, 17 Drawing Sheets

ANCHORING SYSTEM AND METHOD

RELATED APPLICATIONS

This application is a continuation in part of and claims priority to U.S. Ser. No. 11/378,603 filed on Mar. 16, 2006 now U.S. Pat. No. 7,690,319 which claims priority from U.S. Provisional Patent Application No. 60/662,499, filed Mar. 16, 2005, both of which are incorporated herein by reference.

TECHNICAL FIELD

The present invention relates generally to systems and methods for anchoring. More particularly the present invention relates to systems for housing and retracting ropes and/or cables which can be used to anchor vehicles such as water craft or to anchor cargo such as cargo in truck beds.

Figure 1A:
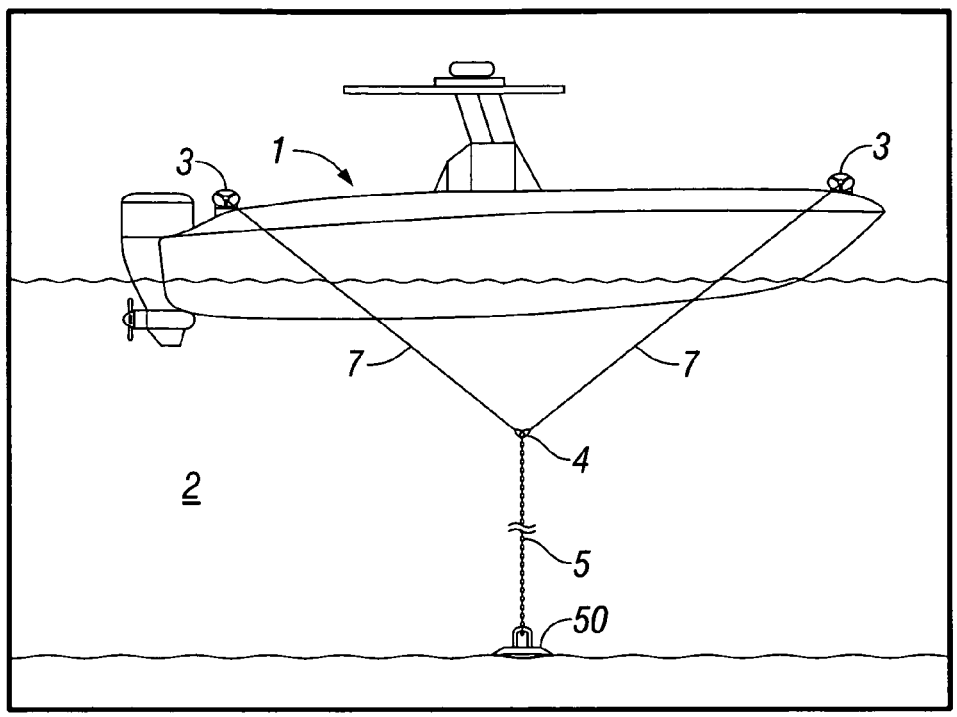
FIG. 1A illustrates a side view of an embodiment of the apparatus attaching a vessel to an anchor in accordance with the present invention.

A better understanding of the principles and details of the present apparatus, will be evident from the following description taken in conjunction with the appended drawings. The drawings constitute a part of this specification and include exemplary embodiments of the present apparatus, which can be embodied in various forms. It is to be understood that in some instances, various aspects of the apparatus can be shown exaggerated, reduced or enlarged, or otherwise distorted to facilitate an understanding of the present apparatus. For a further understanding of the nature and objects of the present apparatus, reference should be had to the following detailed description, taken in conjunction with the accompanying drawings, in which like elements are given the same or analogous reference numbers.

DETAILED DESCRIPTION

The use of docking and mooring ropes is important in keeping watercraft in position, particularly in a dock. In the case of land vehicles, ropes or straps are used to prevent loads from shifting or falling out of truck beds or trailers. Typical docking rope systems and land vehicle cargo retention systems have used electricity or manual cranks to retract the anchoring ropes, cables, or straps into housing units after use. Other systems rely on substantially loose rope which must be tied off at both ends to perform the anchoring function. Many other systems utilize a housing unit which is not flush with the boat, other watercraft, or vehicle, possibly causing injuries to non-observant users. Further, these systems can be bulky and can involve tangling or damaging the ropes or lines. It should be understood that the mooring/anchoring/load securing system described herein is applicable to land vehicles, water vehicles, and air vehicles and as such the generic term vehicle is meant to include all vehicles whether adapted for land, water, or air use or any combination thereof and should not be viewed as a limitation thereof. It should be further understood that other watercraft includes any type of personal watercraft (such as but not limited to, jet skis), small personal or commercial boats/crafts/vehicles (both manually or remote operated), hydroplanes, air boats, duck boats, and other boats/crafts/vehicles, which are used in or near wet environments to which this system is particularly adaptable to. It should be further understood that this system is adaptable to aircraft including those that land or are moored in water environments. FIG. 1G illustrates the use of the system with personal watercraft. Typical personal watercraft have no cleats or convenient tie-down mechanisms. In this case the instant device provides a flush mounted anchoring system is particularly desirable due to the many possible directions of falling off the watercraft (i.e. a cleat or other tie-down receptacle which substantially protrudes from the personal watercraft body could cause serious injury to a user while it is moving).

It should be understood that the rope or cable, as used and claimed herein, can comprise any type of device for attaching, docking, or otherwise restraining land, water, or air vehicles and a variety of cargos. Thus, the rope or cable can include, but is not limited to, rope, wire, cable, straps, life support cables and the like and should not be viewed as a limitation herein. Further, the material of the rope, cable, or other restraining/attaching component can include, but is not limited to, natural rope, synthetic materials, metal, or any combination therein. As such, the material of the rope, cable or restraining device shall not be a limitation herein. In one embodiment the instant device requires no electricity to power retraction of the rope into a housing. In another embodiment, the instant device is flush with the boat or vehicle, wherein there is a decreased likelihood of a user injuring themself on the housing unit or cleat. In another embodiment the device can act as an attachment to an anchor rope to keep a boat stationary. In some embodiments, the anchoring system can be used in conjunction with existing cleats. For safety purposes pop-up or retractable cleats work well with the invention as disclosed. Pop-up cleats are known in the art and will not be discussed in detail. These pop up cleats are typically cleats that move between a retracted position and an extended position. In the retracted position the cleat remains below a surface in a cavity resulting in a substantially flush surface. In the extended position the cleat moves above the surface and can be used in the normal fashion. In still another embodiment the instant device provides an anchoring system for space excursions and/or training for such.

FIG. 1A illustrates a side view of one embodiment of the apparatus as attached to an anchor 50. As illustrated, the boat or water vehicle 1 is floating in the water 2. Keeping the boat or water vehicle 1 floating substantially in place in the water 2 is an anchor rope 5 attached to an anchor 50. Located on the side and on the back of the boat can be the retractable rope housing units 3 (See FIGS. 2 and 3 for further description). The retractable housing units 3 can house and hold the rope or cables 7. The rope or cables 7 can be constructed of materials such as a high strength nylon, a non-rusting metallic alloy, or a non-corrosive material. The rope or cables 7 can be retract into the retractable housing units 3 when the ropes or cables 7 are not being used. In the illustrated embodiment of FIG. 1A, the ropes or cables 7 attach to the anchor rope 5 through the use of a metal ring 4 in the manner typical for attachment of a anchor rope 5 to a plurality of other ropes. It should be noted that one of ordinary skill in the art could readily see how to attach only one rope or cable 7 to an anchor rope 5 or to attach a rope or cable 7 directly to an anchor 50. The cables 7 and the retractable rope housing unit 3 can be designed to at least partially support a conventional anchor utilized with a boat or watercraft 1.

Figure 1B:
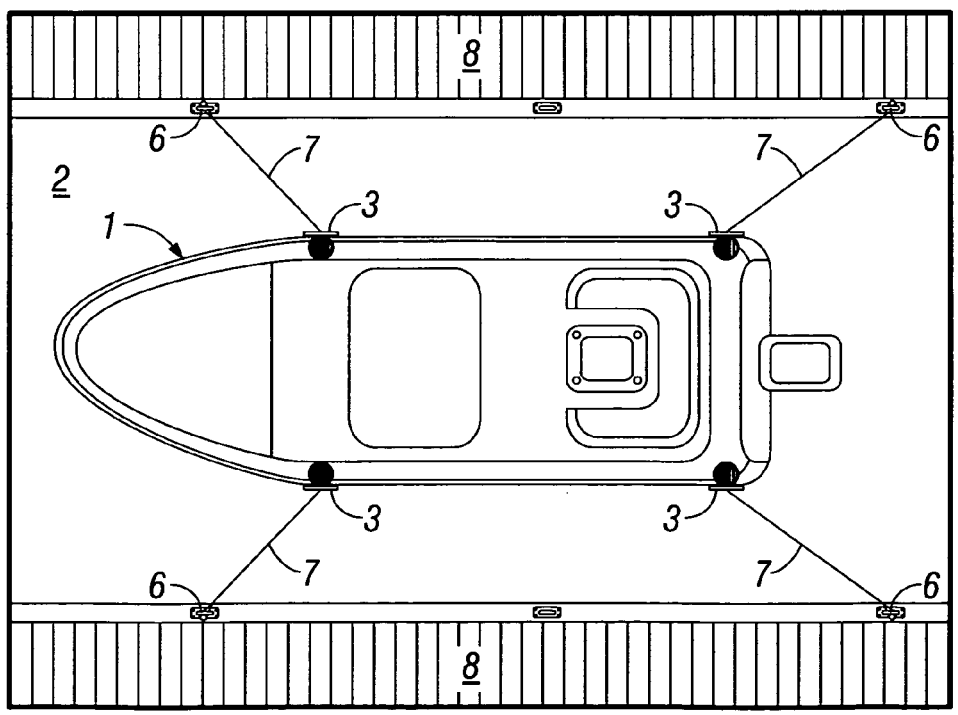
FIG. 1B illustrates a top view of an embodiment of the apparatus attaching a vessel to a dock in accordance with the present invention.

FIG. 1B illustrates one embodiment of the present apparatus as used to anchor a boat to a dock 8. As shown, boat or watercraft 1 is moored to the dock 8 in four positions as attached with the retractable rope housing units 3. To attach a boat or watercraft 1 to a dock 8, a user needs to pull the rope or cables 7 from the retractable rope housing units 3 and tie off the rope or cable 7 on the dock cleats 6. In the illustrated embodiment four retractable rope housing units 3 are being utilized and the rope or cables 7 are attached to four corresponding dock cleats 6. It should be noted that any number of retractable rope housing units 3 could be utilized to attach to any number of dock cleats 6 to moor a boat or watercraft 1. To release the boat or watercraft 1 from the dock 8, a user should detach the ropes or cables 7 from the dock cleats 6. Upon disconnecting the ropes or cables 7 from the dock cleats 6, the ropes or cables 7 should retract into the retractable rope housing units 3. It should be understood that the rope housing 3 can be mounted on the dock 8, on the watercraft 1, or on both. Further, when mounted on the dock 8, the rope housing 3 can be mounted instead of or in addition to the cleat 6 and can either be flush mounted, with the dock 8 surface, can be recessed from the surface, or can be mounted above the dock surface.

Figure 1C:
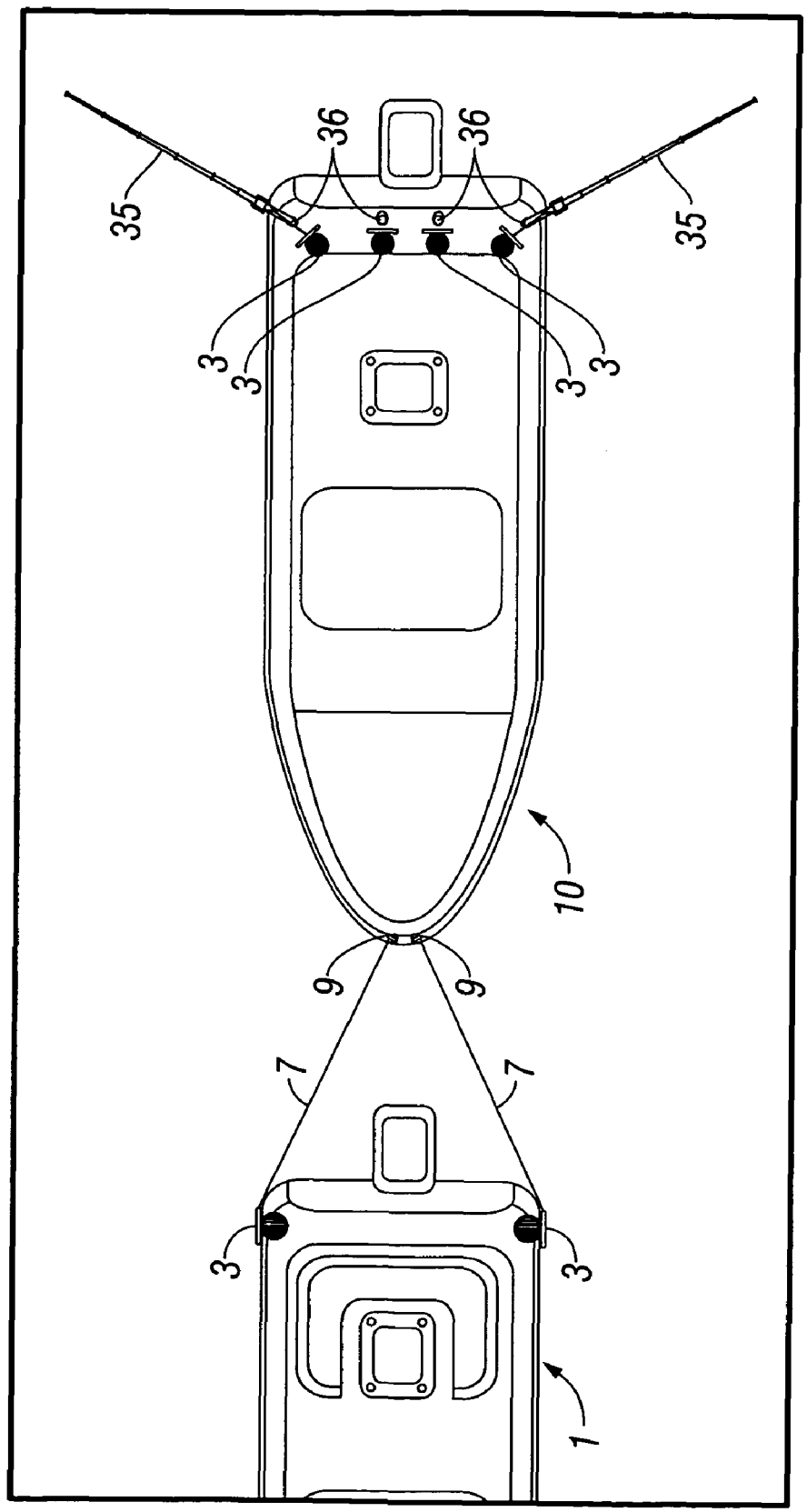
FIG. 1C illustrates a top view of an embodiment of the apparatus towing a vessel in accordance with the present invention.

FIG. 1C illustrates a boat being towed by another boat utilizing the apparatus. The boat or watercraft 1 can be a conventional boat or watercraft 1 with the exception of having the retractable rope housing units 3 attached to the back of the boat which can be on the top deck of the boat or watercraft 1. Attached to and preferably housed in the retractable rope housing units 3 are the ropes or cables 7. The boat or watercraft 10 is of the type typically found in the art with clasps or tie downs 9 located in the front of the boat 10. As illustrated the clasps or tie downs 9 are located at the point of the bow and can be designed so as to allow for easy attachment by the ropes or cables 7. Prior to operation, the ropes or cables 7 are attached to the clasps or tie downs 9 in a conventional fashion to allow for towing of the boat or watercraft 10. While in operation, the retractable rope housing units 3 are actuated to lock the ropes or cables 7 in place so that the ropes or cables 7 are taught and are capable of towing the boat or watercraft 10. At that point the boat or watercraft 1 can proceed forward therein towing the boat or watercraft 10.

FIG. 1C also illustrates another embodiment of the housing units 3. In this embodiment, the housing 3 can be used to attached the ropes 7 to fishing poles 35. As is typical, for many boating fishermen, the fishing rigs 35 are many times kept in cavities 36 along the boat's 10 sides or aft region after they are cast. Similarly, fishing rig holders 36 can be mounted on upper decks of boats 10 for placing the rods 35 into the holders 36 while the fishing line drifts behind or next to the boat 10. Thus, the fishing lines can be cast and the fishing rigs 35 can be released, by the fisherman, until something has been caught on the hook. The rope housing 3 can be mounted next to each rod holder 36, in a central place to reach any number of holders 36, or any combination thereof. The rope 7 can be attached to the rod 35. This prevents the loss of the rod 35 in case a large fish or other large item is hooked and attempts to pull the rod 35 out of the holder 36.

Figure 1D:
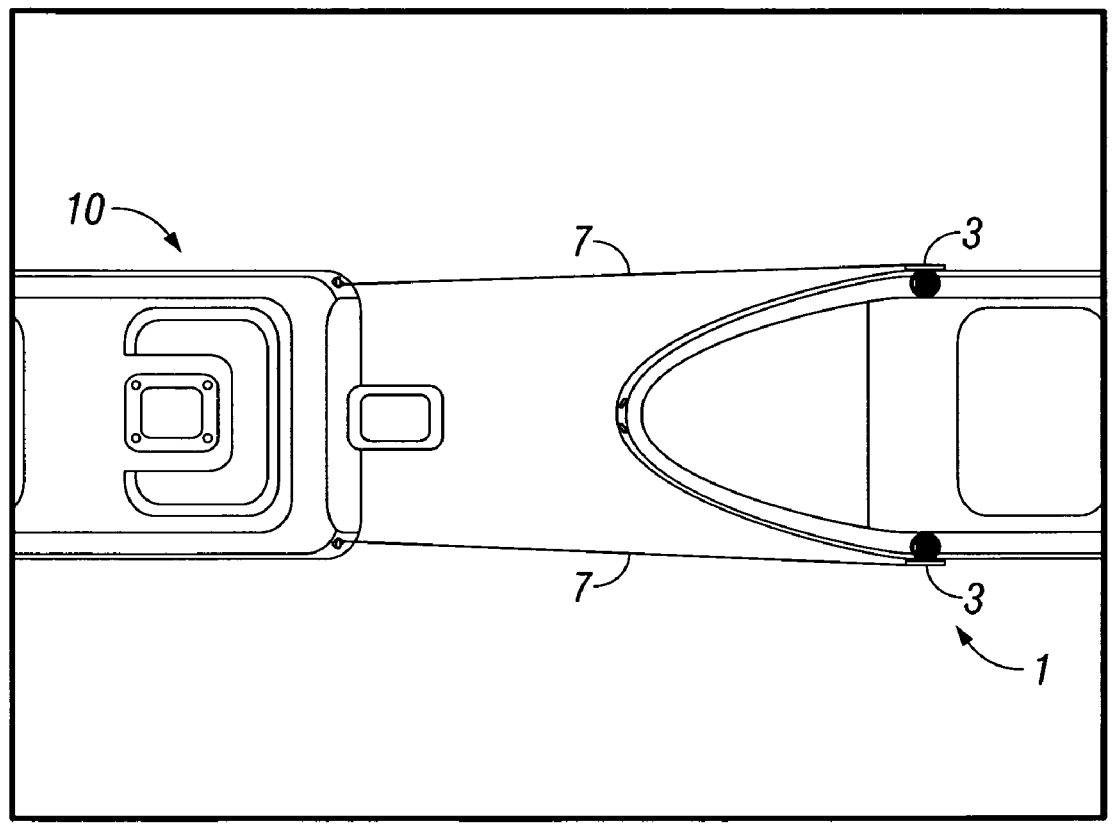
FIG. 1D illustrates a top view of an embodiment of the apparatus being towed by a vessel in accordance with the present invention.

FIG. 1D depicts a boat or watercraft utilizing the present inventive system and apparatus being towed by boat without the present inventive system and apparatus. The boat or watercraft 1 has at least two retractable rope housing units 3 which can be located on the front part of the boat or watercraft 1. It is important to note that one or a plurality of retractable rope housing units 3 and the associated ropes or cables 7 can be utilized in many if not all of the embodiments disclosed herein. The ropes or cables 7 extend out of the retractable rope housing units 3 and can attach to the back side of the boat or watercraft 10 in a conventional fashion as is known in the art for attaching towing ropes or cables. Upon activation, the ropes or cables 7 are firmly attached to the towing boat or watercraft 10 and the retractable rope housing units 3 are actuated so that the ropes or cables 7 are pulled taught and will allow for the towing of boat or watercraft 1. Upon deactivation the ropes or cables 7 are disengaged from the towing boat or watercraft 10 and are then retracted in the retractable rope housing units 3 for storage.

Figure 1E:
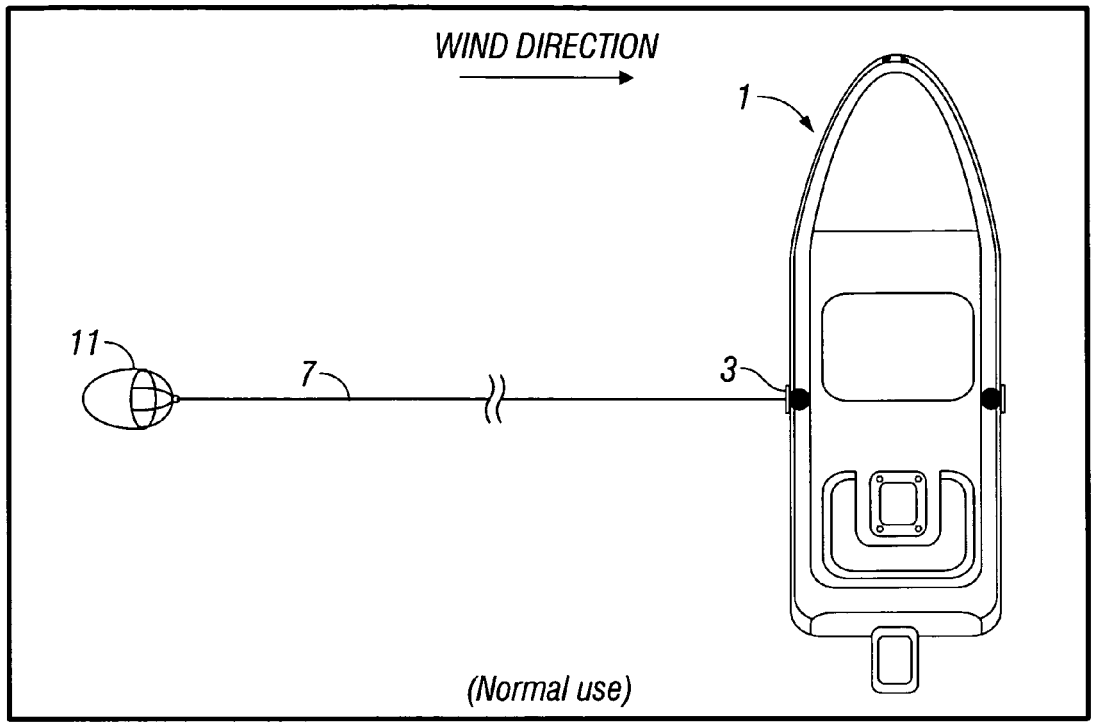
FIG. 1E illustrates an embodiment utilizing a sea anchor in accordance with the present invention.
Figure 1E:
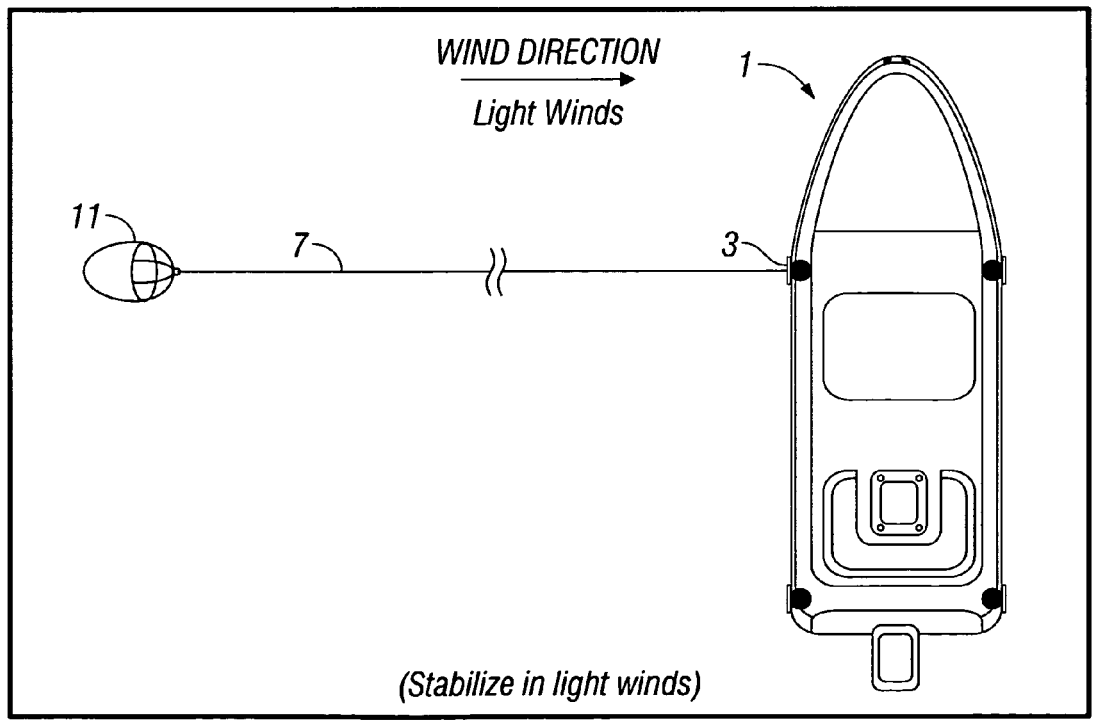
Figure 1E:
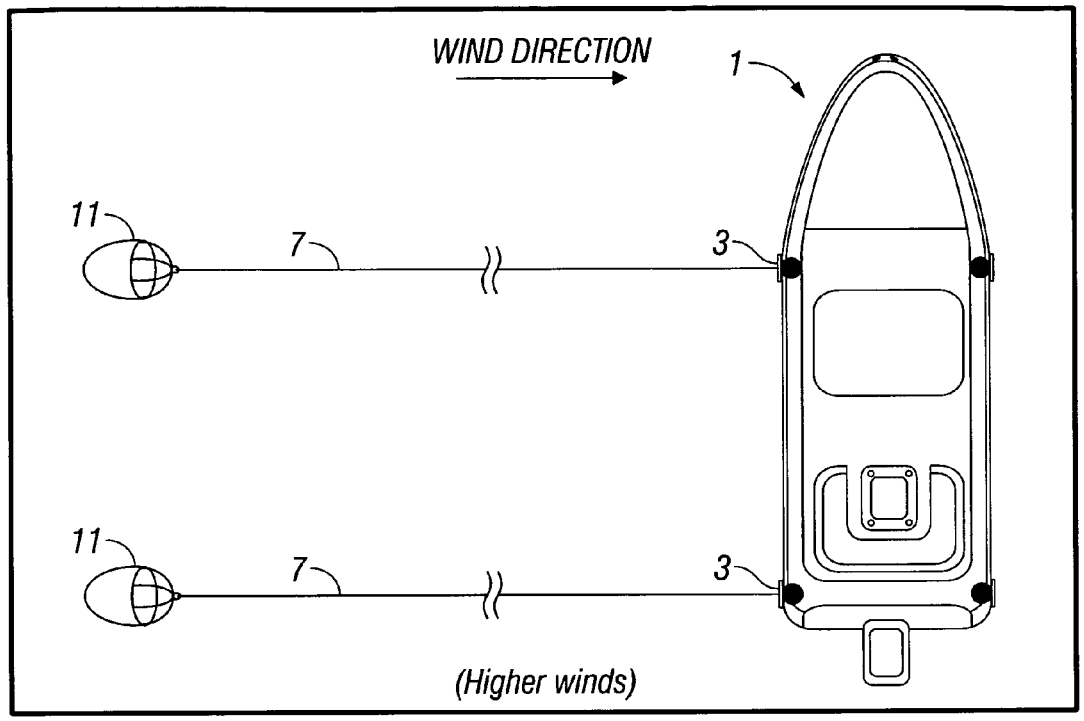
Figure 1E:
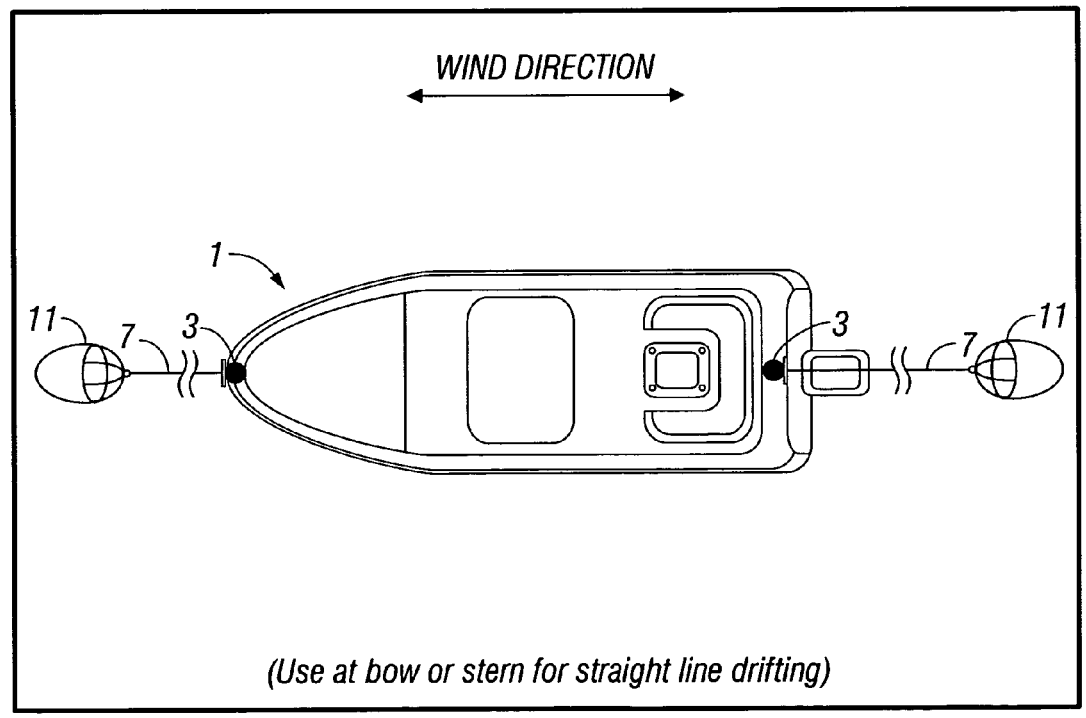

FIG. 1E illustrates several methods of attachment to a sea anchor. The boat or watercraft 1 as depicted in the various illustrations can have the retractable rope housing units 3 attached to the boat or watercraft 1 in various ways and a boat or watercraft 1 can also have one or a plurality of retractable rope housing units 3. As shown, when in use each rope or cable 7 stemming from a retractable rope housing unit 3 attaches to a corresponding sea anchor 11. The sea anchors 11 are of the kind conventionally utilized with boats or watercraft and can be of any size typically used for a given boat or watercraft. In operation the ropes or cables 7 are pulled from the retractable rope housing units 3 and are attached to the sea anchor(s) 11 in the manner conventional in the art. The sea anchor(s) 11 are then positioned in the water as desired to either maintain the boat or watercraft's I position or to allow for the boat or watercraft 1 to drift with the tide.

Figure 1F:
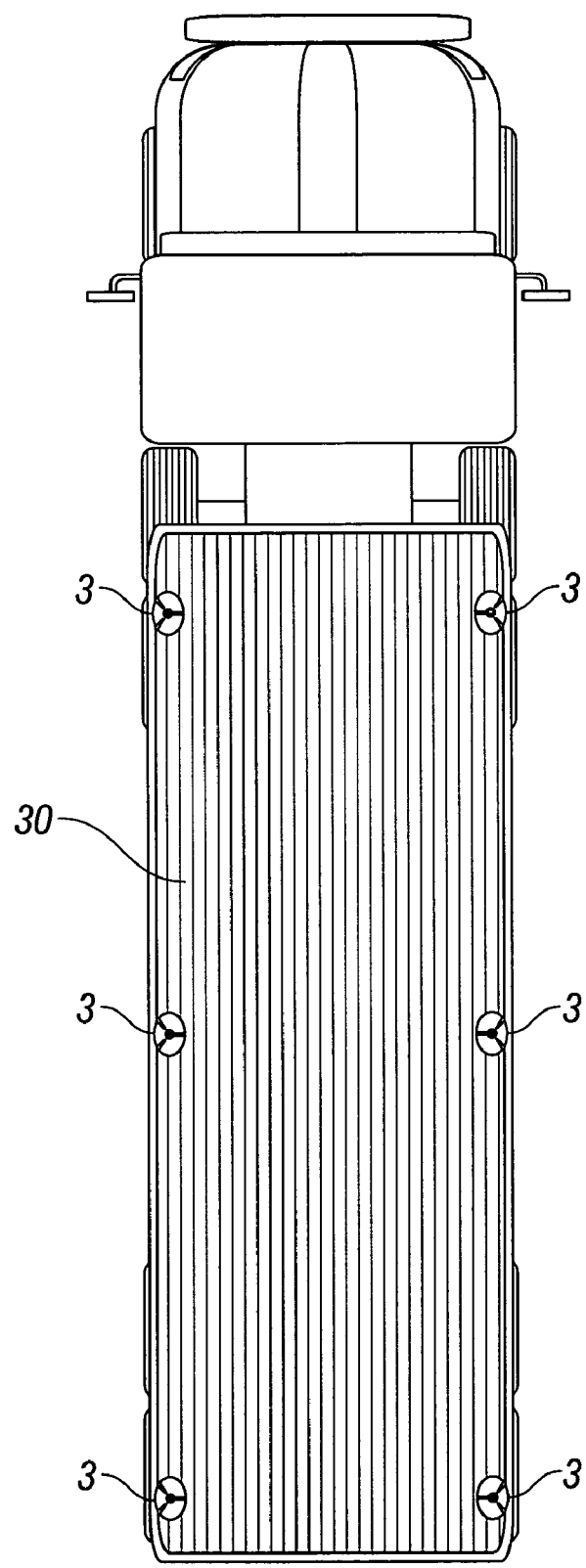
FIG. 1F illustrates a top view of an embodiment of the apparatus mounted in a truck/trailer bed in accordance with the present invention.
Figure 1G:
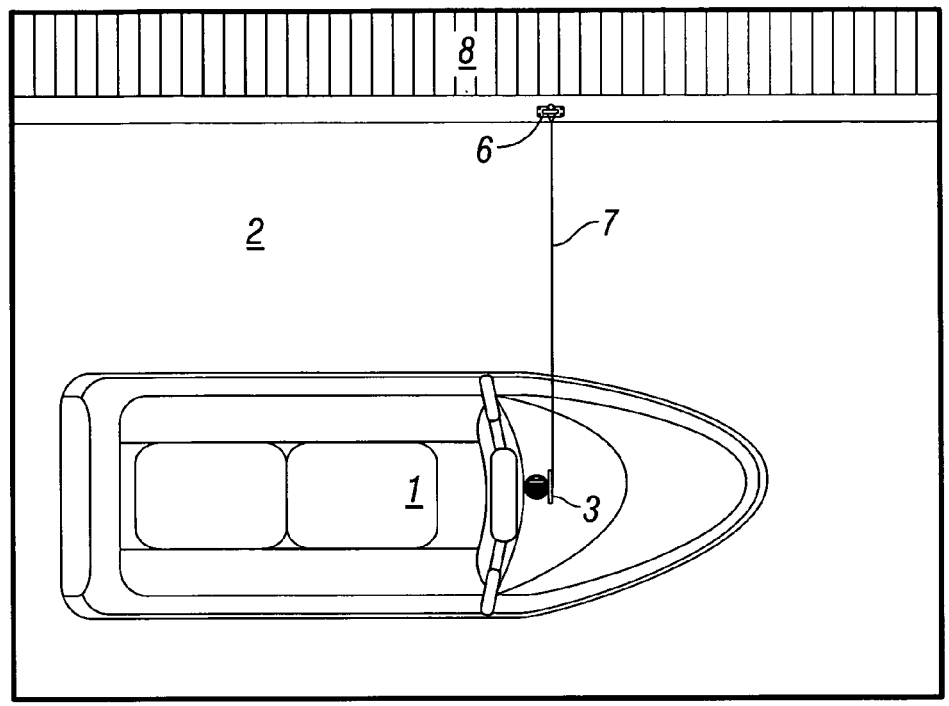
FIG. 1G illustrates a top view of an embodiment of the apparatus tethering a watercraft in accordance with the present invention.

FIG. 1F illustrates the present device mounted on a truck bed 30. The housing units could also be mounted so as to extend beyond the bed or wall surface of a truck since unlike watercraft 1, users typically do not have to walk around the housing units while boarding or departing or during use. It should be understood, by those skilled in the art, that the methods of securing loads in a truck bed or trailer and the methods of securing the watercraft 1 are similar as far as the actual utilization of the ropes 7 and the housing 3. Therefore, the description, of the construction and use of the present invention, would apply to use in trucks or water vehicles. The exception may be that the materials of construction can vary depending on the application, i.e. corrosive salt water environment, land use, or any other use FIG. 1G illustrates an embodiment of the housing 3, wherein the watercraft 1 being tethered to the dock 8 is a personal watercraft. Personnel watercraft typically share a common problem when docking. One must stand up and remove the seat to retrieve rope or cable for mooring. Next, the watercraft must be tied off to or otherwise tethered to the dock or other stationary structure. Particularly, the tethering may be a cumbersome and safety encumbering task as one must lean across the craft to reach the stationary attachment point or one must leave the craft to reach the stationary attachment point. Thus, it is easily seen how personal watercraft operators can injure themselves (or others if carrying passengers) while attempting to dock or moor the personal watercraft (whether it be from losing one's balance just retrieving the rope or during the tethering operation itself). Further, this process must be reversed when one is ready to un-tether the personal watercraft. In one embodiment the housing 3 is flush mounted or recessed relative to the surface of the personal watercraft 1 the rope 7 can then be extended and ties to cleat 6 (or another housing 3, if such is mounted to the dock 8). It should be appreciated that more than one rope housing 3 can be mounted on the personal watercraft 1. However, size limitations of the personal watercraft 1 may make the mounting of several rope housings thereon impractical.

Figure 1H:
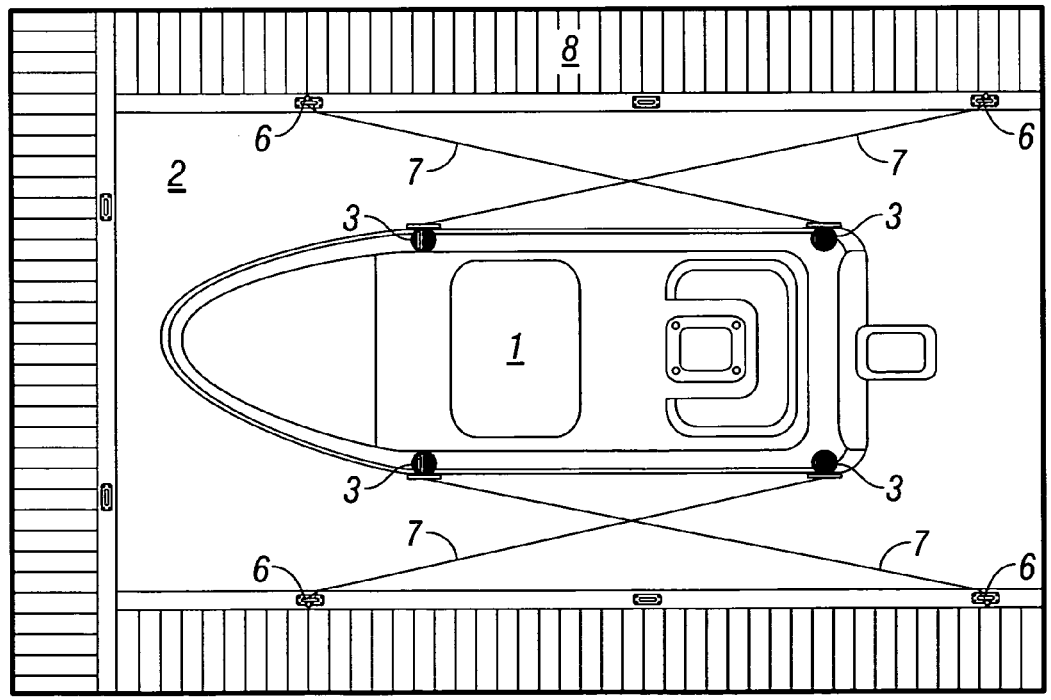
FIG. 1H illustrates a top view of another embodiment of the apparatus tethering a watercraft in accordance with the present invention.

FIG. 1H illustrates an embodiment of housing 3, wherein the boat, watercraft, or other vehicle 1 is being tethered in a manner that allows the docked boat, watercraft, or other vehicle 1 to remain more stabilized and centered in its docking position. As is well known in the art, boats or other craft 1 are typically tied down in such a manner as to compromise between the craft bumping certain areas and floating a certain distance (including being able to float upwardly from the dock 8 in case of a sudden rise in water level). The present system can be utilized in a manner such that the rope or cable 7 is always being retracted toward the housing 3. It should be understood that once extended, rope or cable 7 will always attempt to retract. Thus, if retraction is unwanted, the rope or cable 7 can be tied off to the cleat 22 (see FIG. 4). As illustrated in FIG. 1H, the ropes 7 are extended and tied off to the dock 8 in a manner that forms a cris cross pattern. This can be accomplished in a variety of ways and should not be viewed as a limitation herein. A typical pattern comprises attaching a rope or cable 7 from a forward mounted apparatus 3 to an attachment point 6, on the dock 8, aligned closer to rear of the craft 1. A rope or cable 7, from a rear mounted apparatus 3 can be attached to an dock 8 attachment point 6 that is aligned closer to the front of the craft 1. In this manner and since the ropes 7 are biased to always retract, as the craft 1 moves forward, the forward mounted rope 7 is extended while the rear mounted rope 7 is retracted. Since both apparatuses 3 can have substantially the same spring tension attempting to retract the ropes 7, the extension of one rope 7 will be counterbalanced by the retraction of the other rope 7 and thus the craft 1 will tend to stay in substantially the same position. It should be appreciated that this cris crossing of the mooring ropes 7 can include several other attachment points including the sides of the craft not adjacent to the dock 8. It should be further appreciated that it would be quite difficult to eliminate all movement of the craft 1, however, the stability would be much greater than with conventional systems. It should be noted, that in case of rising water levels, the craft 1, utilizing the instant system would be less likely to sink due to the water level rising a distance greater than the slack between the dock 8 and the craft 1 because the ropes 7 would continue to extend and allow the craft to rise at a substantially level pace.

Figure 1I:
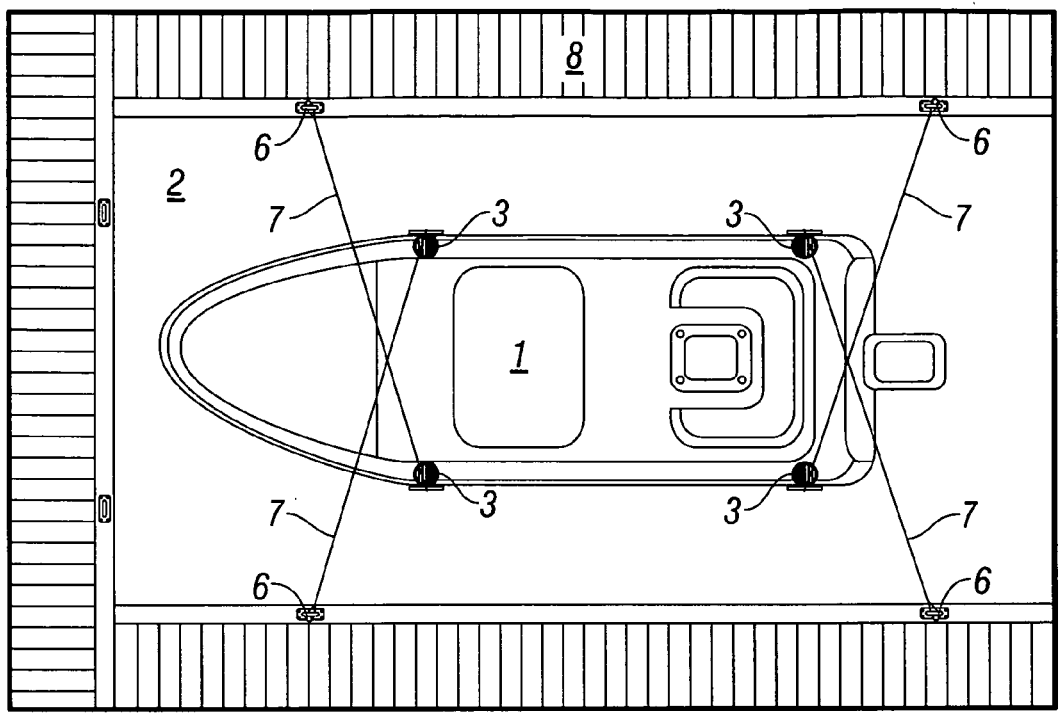
FIG. 1I illustrates a top view of another embodiment of the apparatus tethering a watercraft in accordance with the present invention.
Figure 1J:
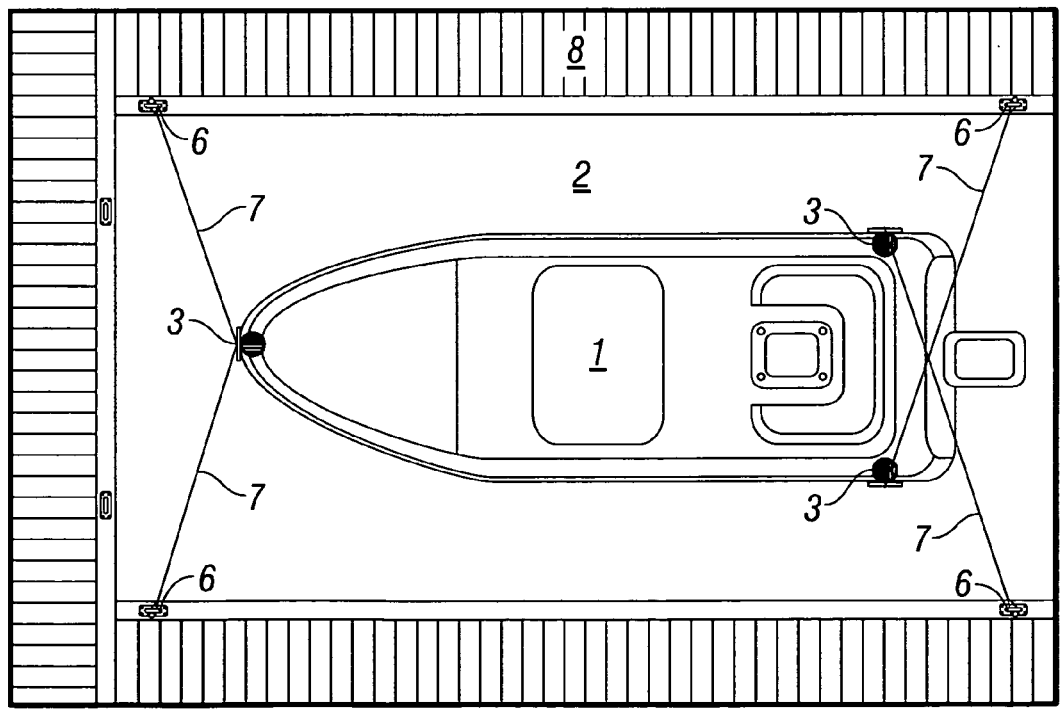
FIG. 1J illustrates a top view of another embodiment of the apparatus tethering a watercraft in accordance with the present invention.
Figure 1K:
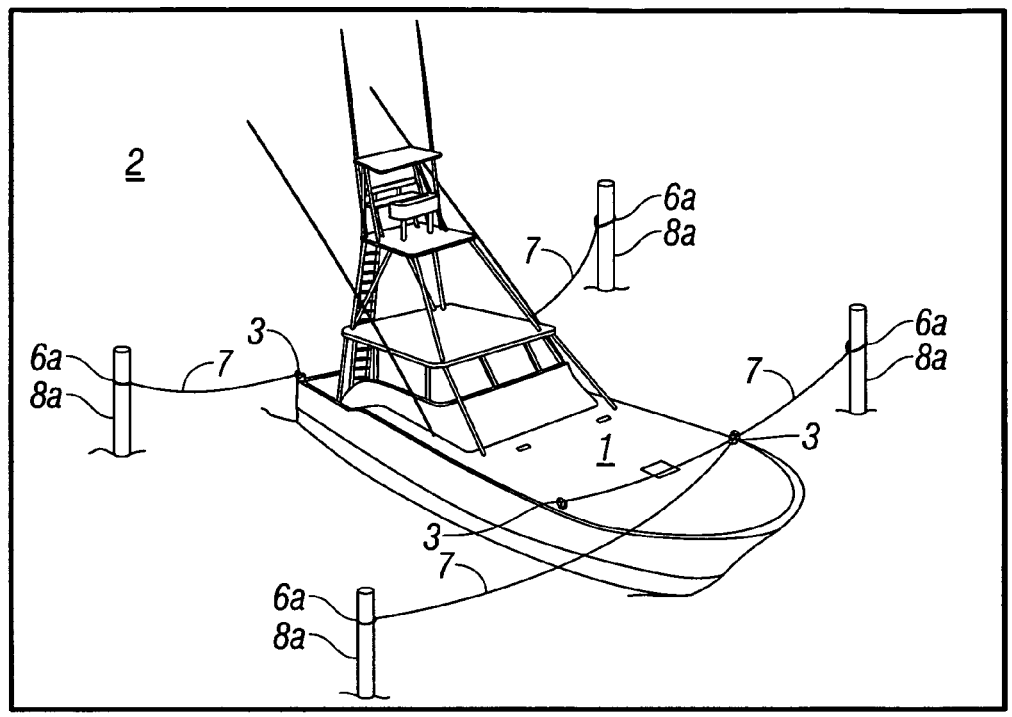
FIG. 1K illustrates a top pictorial view of another embodiment of the apparatus tethering a watercraft in accordance with the present invention.

FIGS. 1I, 1J and 1K further illustrate the concept described hereinabove wherein the retraction of the cable or rope 7 substantially maintains the craft 1 in position within a docking area. To further illustrate the variety of attachment points, FIG. 1K illustrates pier docking wherein a watercraft is moored to piers 8a at attachment points 6a. In one embodiment, the rope or cable 7 is secured from the starboard side, of the craft 1, to the port side of the dock 8. Another rope or cable 7 can be secured from the port side of the craft 1, to the starboard side of the dock 8. It should be appreciated that any aft or rear mounted housings 3 can be similarly attached (i.e. crisscrossing the craft 1) and that combinations of the crisscross, such as the aft attachments only (such as FIG. 1K), rear attachments only, both aft and rear attachments (FIG. 1I), or any combinations thereof can all be utilized without departing from the scope of this invention. It should be understood that the position of the housing 3, whether on the craft 1, or on the dock 8, on both, or in any combination therein can achieve the same result as depicted in FIGS. 1I, 1J, and 1K without departing from the scope of the invention. Further, it should be appreciated that an combination of the crisscross pattern will help stabilize the craft 1 and thus substantially maintain the position of the craft with respect to the dock 8.

Figure 1L:
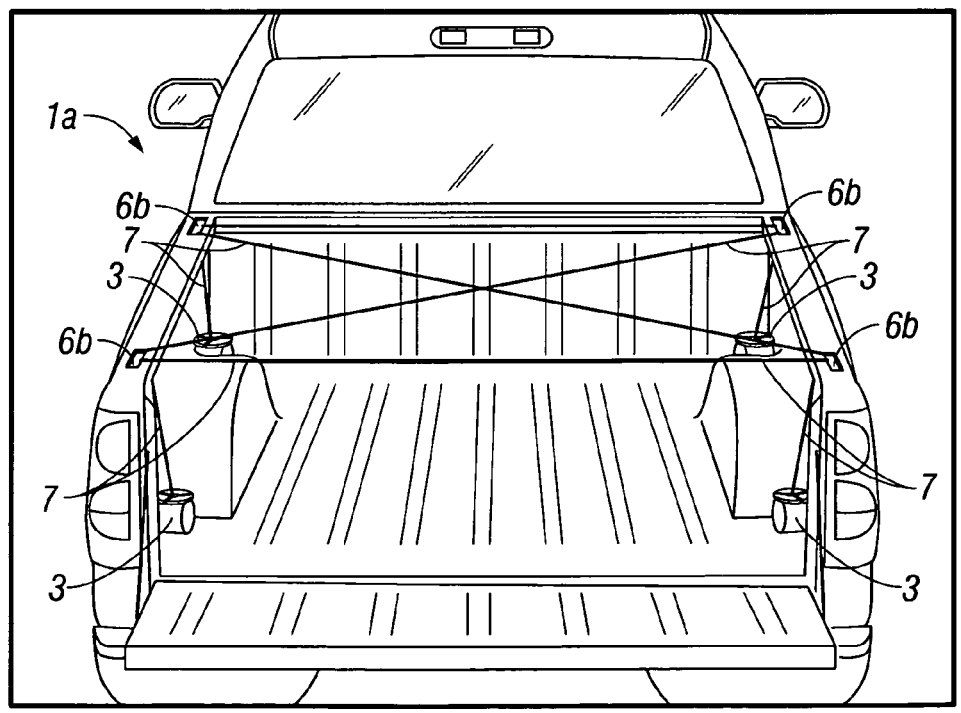
FIG. 1L illustrates a rear perspective view of another embodiment of the apparatus tethering a load in accordance with the present invention.

FIG. 1L illustrates a similar crisscross pattern of attachment for securing loads in trucks or trailers. Here, the housings 3 are mounted in a truck bed 1a (or in a trailer bed). The housing are depicted in each corner of a truck bed, but they could be configured in a number of ways to facilitate holding cargo down in the bed of the truck. It should be appreciated that the housing units 3 could be mounted in the bed of a truck, such as but not limited to a pick-up truck, on the sides or walls of the truck, or even to a trailer bed and/or walls. The housing units can be flush mounted in the walls of the pick up truck bed as they can be mounted below the surface of the truck bed. The ropes or cables 7 are extended and attached to housings 3 or other attachment points 6b located in the truck bed or trailer 1a. It should be appreciated that when utilized, in any type of vehicles, a housing 3 can serve as both a source of the rope or cable 7 as well as an attachment point for a rope or cable 7 extending from another housing 3.

Figure 1M:
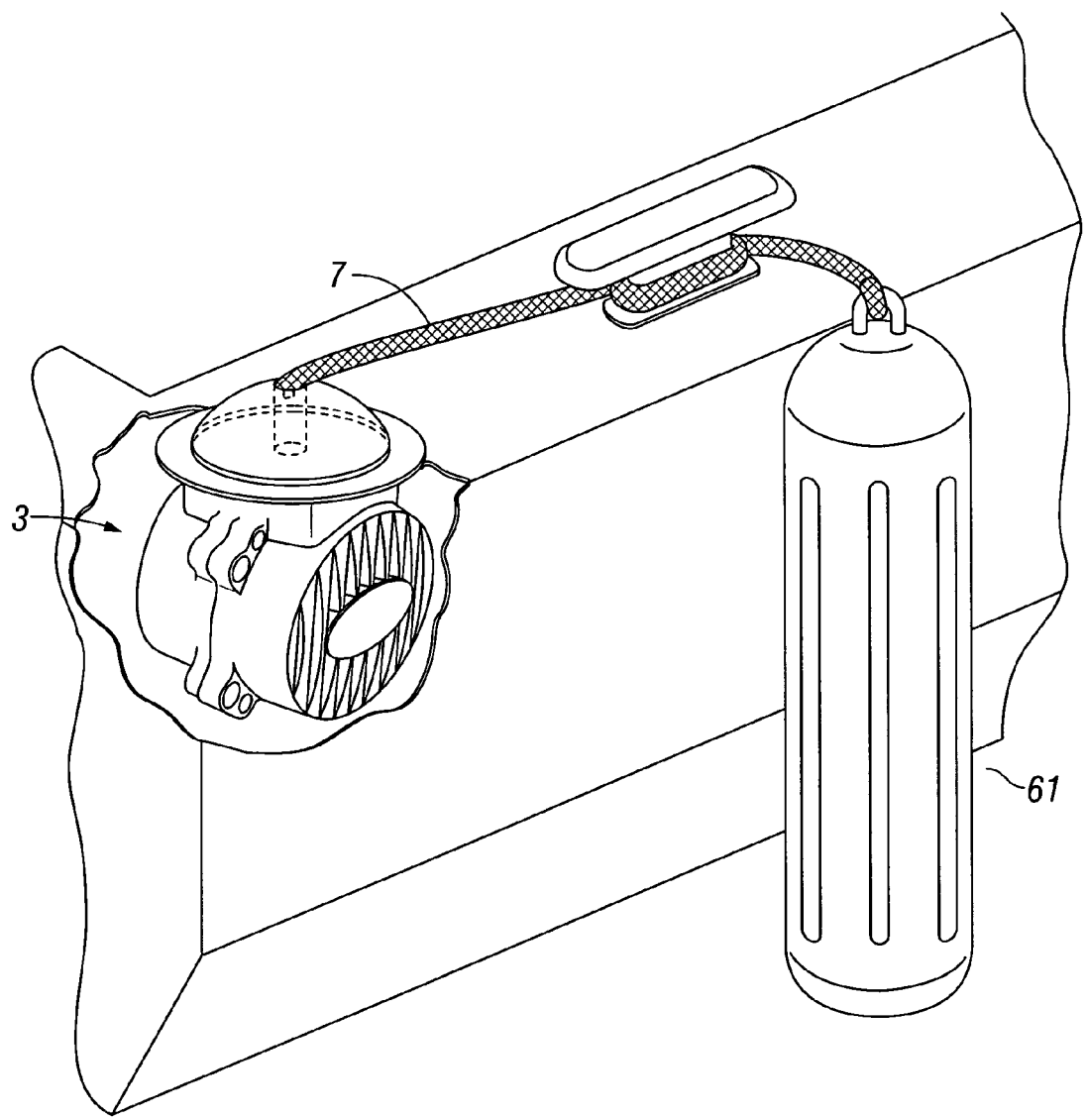
FIG. 1M illustrates a perspective view of another embodiment of the apparatus tethering a fender or a bumper over the side of a water craft.

FIG. 1M illustrates an alternative embodiment where the anchoring system ropes or cables 7 are attached to a fender 61.

In this configuration a cleat on the boat or on the anchoring system can be used to secure the fender over the side of the boat in a desired location. Fenders suspended over the edge of a boat or other watercraft in this manner serve to protect the watercraft from bumping against objects such as a deck. A cleat or catch mechanism in the anchoring unit, as will be described in greater detail later, can be used to let out an appropriate length of rope 7 for hanging the fender over the side of a boat. A cleat on the boat itself can allow the fender to be placed in the correct position.

The anchoring system discussed herein has a number of potential applications, and the embodiments illustrated with respect to FIGS. 1A-1M are only illustrative examples of those embodiments. For example, the anchoring system could be implemented on spacecraft such as a space shuttle or a space station as a safety feature for space walks. The anchoring system could also be implemented into systems designed to simulate zero gravity scenarios, such as training for space walks in a pool. Extra-vehicular activity (EVA) is work done by an astronaut away from the Earth and outside of a spacecraft. The term most commonly applies to an EVA made outside a craft orbiting Earth (a spacewalk). When undertaking an extra-vehicular activity an astronaut needs to be secured to the vehicle because absent gravity and an atmosphere there is risk of developing relative momentum away from the spacecraft and drifting away. The housing of the anchoring system as disclosed can be integrated on existing shuttles or space stations as a safety feature. The housing can be secured in a known fashion to the interior of the craft.

Figure 2A:
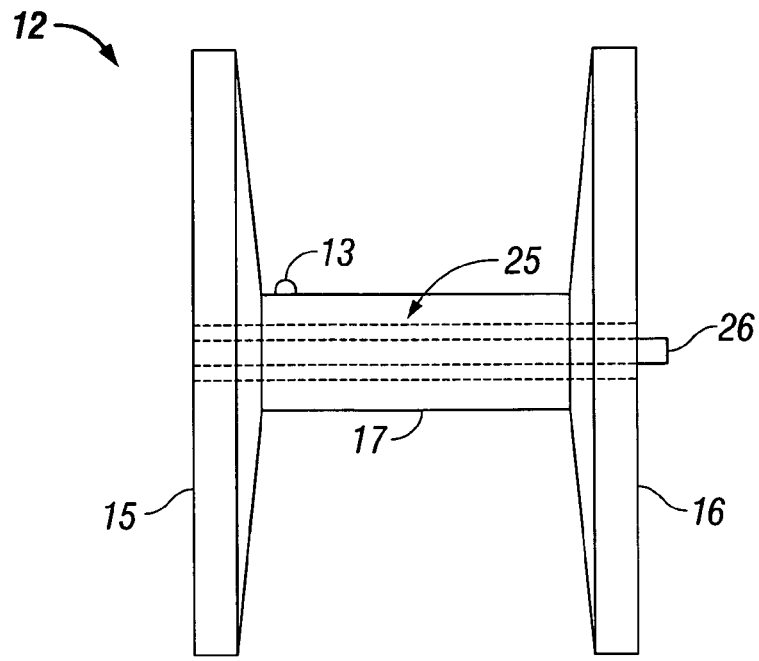
FIG. 2A illustrates a side pictorial view of the rope or cable spool in accordance with the present invention.
Figure 4:
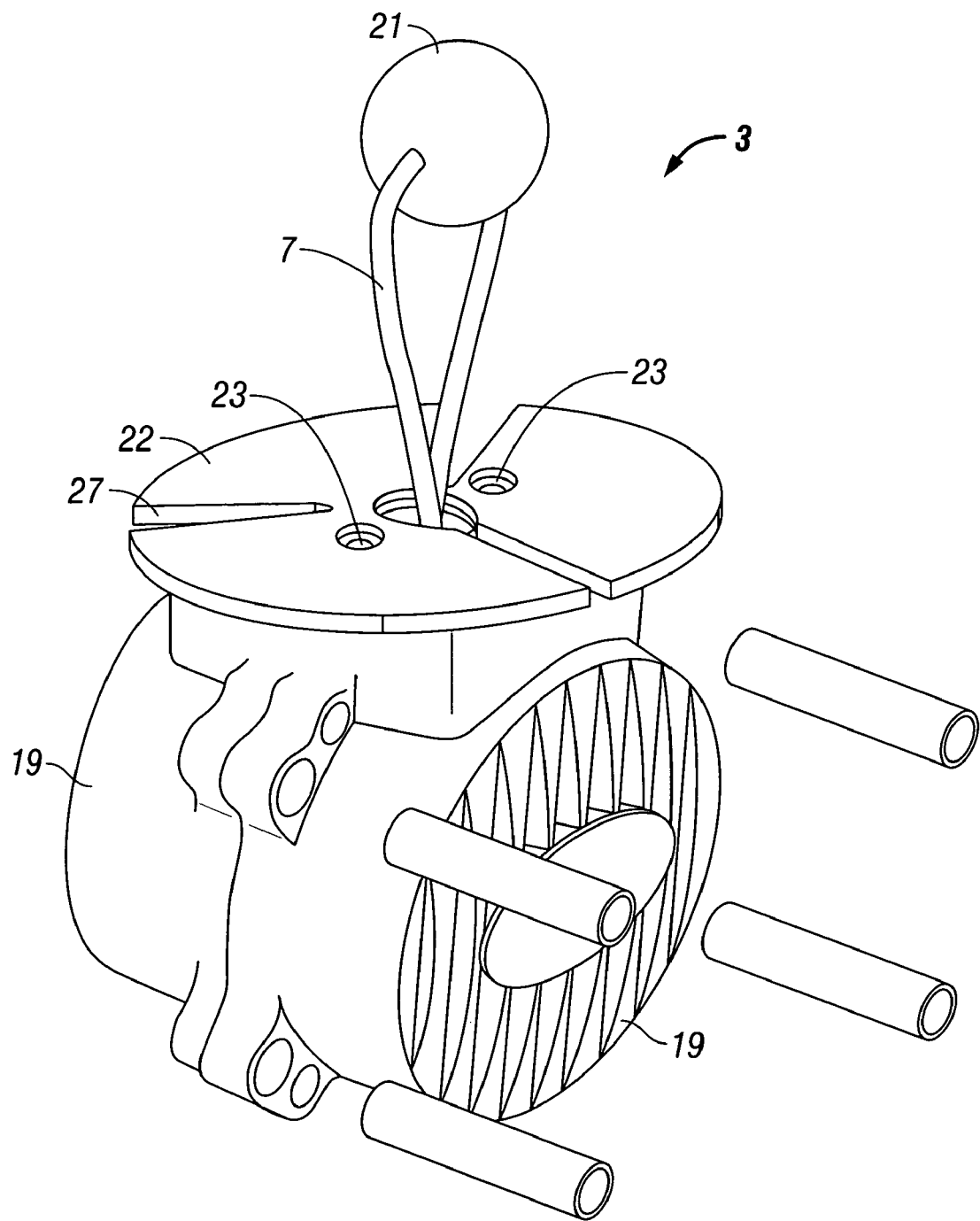
FIG. 4 illustrates varying designs for cleating units in accordance with the present invention.

FIG. 2A is a side view of the rope or cable spool 12. The rope or cable spool 12 can be designed to allow about fifteen to sixty feet of rope or cable 7 to be wound about its core 17. It should be noted that one of ordinary skill in the art could easily conceive of the rope or cable spool 12 being so constructed as to wind less than fifteen feet of rope/cable or more than sixty feet as needed. It should be appreciated that the length can depend on the size of the craft, the load being carried (size and weight), where the craft/vehicle is used or moored, and other similar circumstances. The spool 12 can be constructed so as to be non-rusting or non-corrosive and capable of aquatic and/or land use as needed. The spool 12 can be designed to have a first ridge 15 and a second ridge 16 to ensure that the rope or cable 7 is wound about the core 17 without any snags or problems. The first ridge 15 can be seen in FIG. 2A and defines a first guide for rope or cable wound around the spool 12. The second ridge 16 defines a second guide and in combination with the first ridge 15 rope or cable is guided to wind about the core 17 of the spool 12. The second ridge 16 can be constructed to have a cavity to allow for mechanisms, such as, but not limited to, a spring (see FIG. 2B), to reside within to retard, stop or allow the spool 12 to rotate therein allowing rope or cable 7 to come off of the spool. It should be appreciated that either or both ridges could be constructed to have hollow interior for housing mechanisms such as springs. The mechanisms located within the cavity of the second ridge 16 are also designed to have a retraction feature, wherein the rope or cable 7 would be retracted and wound about the core 17 when the inventive apparatus is not use. It is foreseen that a clock spring mechanism would be employed to carry out this function. However, it should be appreciated that other spring type actuation or other mechanical actuation can be employed. In order to attach the rope or cable 7 to the spool 12, there can be an internal catch or clasp 13 located on the core 17. There can be a small portion of the rope or cable 14 is placed through the catch or clasp 13 and securely held in place by the catch or clasp 13 such that the rope or cable 7 will be anchored to the spool 12. Therefore, upon rotation of the spool 12 the rope or cable 7 will wind about the spool 12. The spool 12 can also be constructed so that there is a hollow area 25 running through the core of the spool to allow for a rod 26 to pass through the core of the spool 12 therein keeping the spool 12 in place in the housing unit 3 (FIG. 4).

Figure 2B:
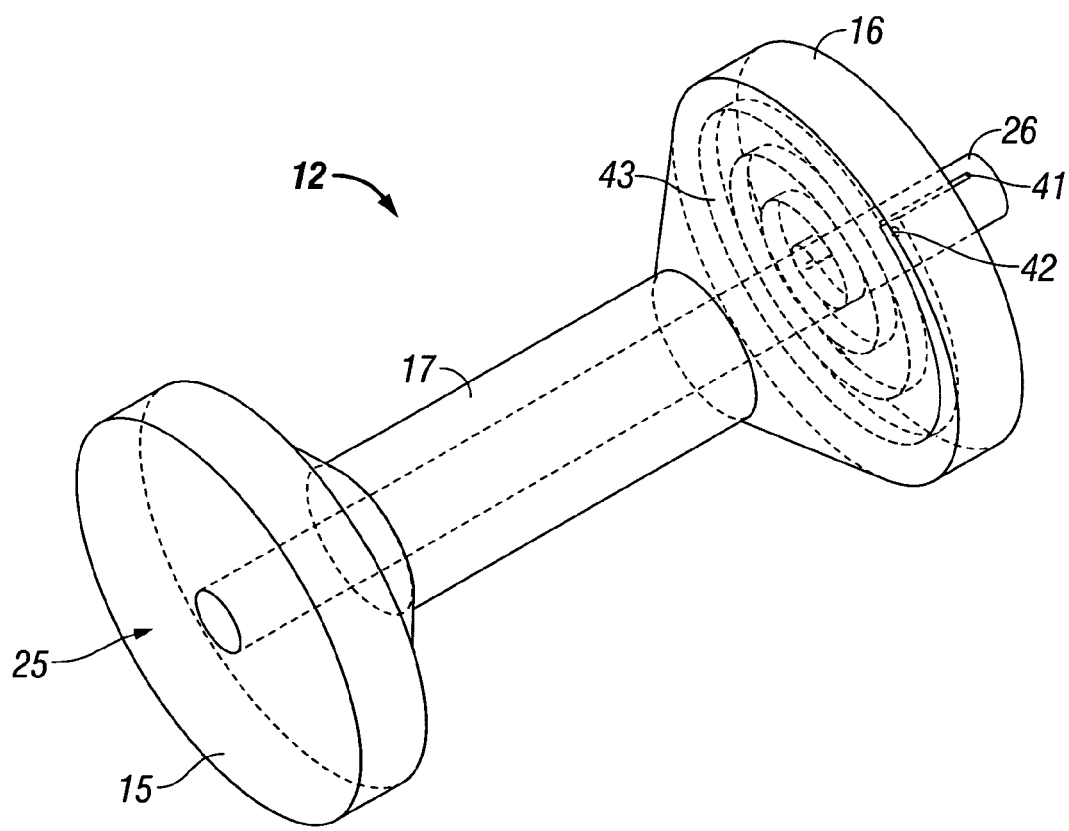
FIG. 2B illustrates a side view, partially in cross section, of the rope or cable spool in accordance with the present invention.

FIG. 2B further illustrates an embodiment of the cable spool 12 and the second ridge 16. As described above, the second ridge 16 can house the spring mechanism that biases the spool to rotate in a manner urging the retraction of the rope 7. The interior of the second ridge 16 can house a spring 43. Spring 43 can be metal but can also be a variety of materials. It should be appreciated that the materials of construction, of the spring 43, will have a direct bearing on the spring characteristics and thus the tightness of the rope 7. The spring 43 can comprise several coils, with one end of the spring 43 connected to the rod 26. The rod 26 can be a split screw with the split 41 being at one end and available for the insertion of one end of the spring 43. The other end of the spring 43 can be connected to a screw or catch 42 which can be mounted to a wall of the second ridge 16. It should be apparent that the end of the spring 43 can be attached in a variety of manners and that the attachment of the spring ends should not in any way be viewed as a departure from the claims of the instant invention. When the rope 7 is extended, the spring is stretched and thus biased so as to spin the spool in a direction to retract the rope or cable 7. Thus, the rope 7 is always being pulled back into the housing 3.

The unique, compact design of the claimed invention resides, in part, in the placement of the spring 43 in the second ridge 16, as opposed to placing the spring 43 in the core 17 of the spool 12. By placing the spring 43 in the second ridge 16, or outer portion, of the spool 12 the outer diameter of the core 17 is kept to a minimum while allowing a substantially larger and stronger spring 43 to bias the spool 12. Reducing the cores 17 outer diameter allows substantially more rope or cable to be wound in the same the same space. A larger and stronger spring 43 can be placed in the ridge resulting in both greater tension and more line available in a compact unit.

Figure 3A:
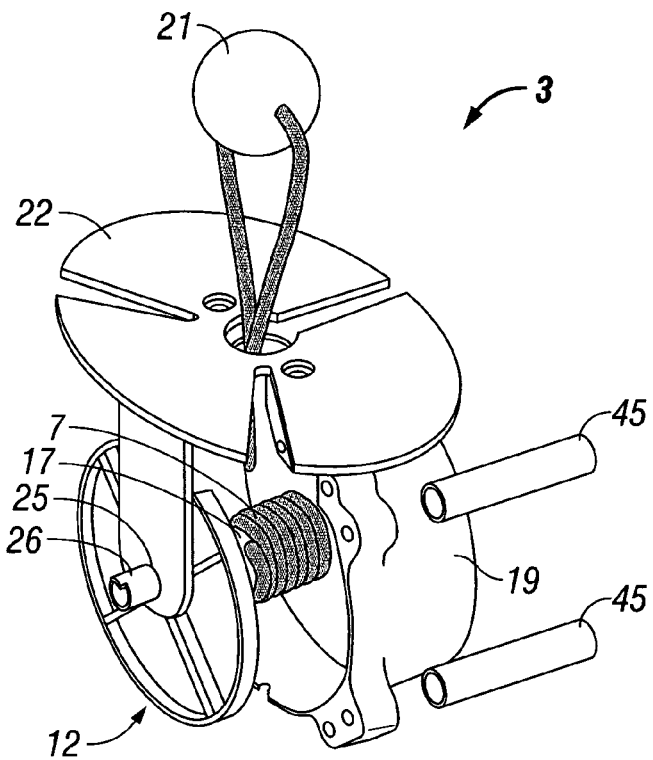
FIG. 3A illustrates an interior pictorial side view, partially in cross-section of the rope or cable spool as found housed in an embodiment of a housing unit in accordance with the present invention.

FIG. 3A illustrates a partial interior side view of the rope or cable spool 12 as can be housed in one embodiment of a housing unit 3. As shown there is a rope or cable 7 partially wound around the core 17. The spool 12 is kept centered in the housing unit 3 by a the rod 26 which runs through the hollow area 25 in the core of the spool. The spool is capped into the housing unit 3 by a casing 19 through with the end portion of the rod 26 runs. It should be appreciated that the casing 19 can be a two piece housing, a multi-piece housing, a single piece with or without a cap, or any combination thereof. The casing 19 can be constructed to allow for the spool 12 to rotate as needs be without the casing 19 introducing any serious friction elements. The casing 19 can also be constructed so as to have a hole or outlet by which the rope or cable 7 can exit the housing system 3 when in use.

FIG. 3A also illustrates attachment standoffs 45 which can be used when mounting the housing 3 onto a truck or trailer bed 30 (see FIG. 1F). The standoffs 45 allow for the housing 3 to remain clear of the bed 30. It should be understood that the housing 3 can be bolted to a bracket (not shown) which is mounted to the truck/trailer bed. In such a case the standoffs 45 may or may not be required depending on the bracket design. It should be further understood that some beds 30 can be designed to have or can have a false floor added onto the bed 30. Thus, the entire housing 3 can be mounted flush with or recessed from the false floor.

Figure 3B:
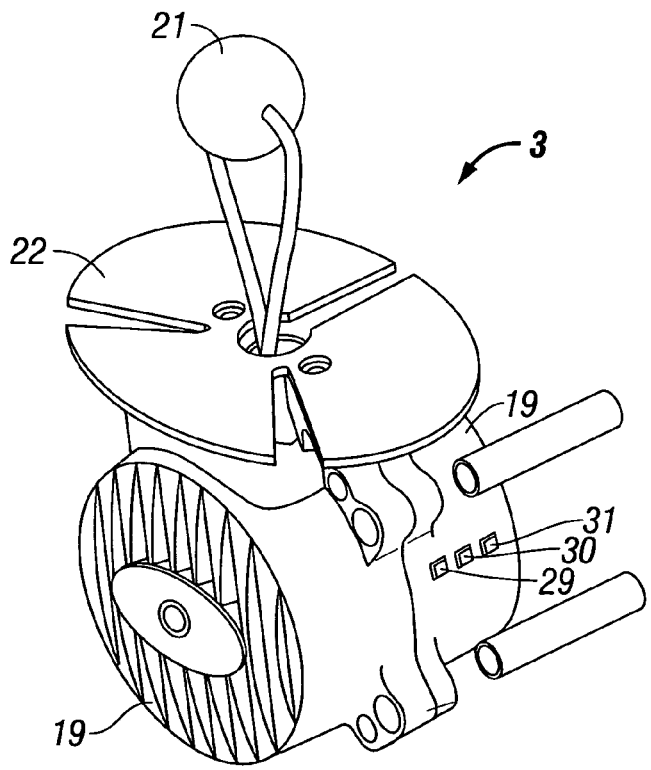
FIG. 3B illustrates a pictorial side view of the rope or cable housing with operational actuation mechanisms in accordance with the present invention.

As illustrated in FIG. 3B, there can be located on the casing 19 of one embodiment three engagement buttons, the release system button 29, the catch system button 30, and the retraction system button 31. It should be noted that one of ordinary skill in the art could readily conceive of a single button or activation mechanism that could encompass all three functions of release, catch and retraction. Further, it should be apparent that the location of the buttons can change depending on the mounting orientation of the housing unit 3 as well as any other installation preference. The release system button 29 can be constructed so as to be attached to a series of gears and/or springs or similar activation mechanisms located in the housing unit 3. The gears and/or springs are generally designed to interact and contact the spool 12 such that certain positions of the gears and/or springs will allow for certain movement of the spool 12. When the release button 29 is actuated, the gears and/or springs substantially disengage the spool 12 to allow for freewheeling motion. The freewheeling motion allows for the spool 12 to move freely and rotate about the rod 26. Since the spool 12 can rotate, a user could then pull on rope or cable 7, therein unwinding the rope or cable 7 from the spool 12 for use exterior to the housing unit 3. When the catch button 30 is actuated, the gears and/or springs substantially engage the spool 12 and keep the spool 12 in a stationary position. The stationary position of the spool 12 acts like a braking mechanism and effectively keeps the cable or rope 7 from being unwound or wound onto the spool 12. It is foreseen that the catch or braking mechanism can be utilized to keep the rope or cable 7 stabilized while the boat or watercraft is moored, docked or in tow. When the retraction system button 31 is actuated, the gears and/or springs substantially engage the spool 12 and act to rotate the spool 12 therein winding the cable or rope 7 on the spool 12. Such winding action will continue until the retraction system button 31 is deactivated or the rope or cable 7 is completely wound around the spool 12, with the exception of the end portion that can extend slightly out of the housing unit 3. The retraction aspect of the spool 12 allows for the rope or cable 7 to be wound onto the spool 12 for easy and quick storage. It should be noted that the present inventive device could be constructed such that the original positioning stage of the spool 12 can be in the catch, release or retraction mode. It should also be appreciated that embodiments without buttons still fully function with retraction and extension available at all times. It may be desirable to have extension and retraction with the spring 43 (see FIG. 2B) being biased for the retraction mode.

FIG. 4 illustrates a cleat 22 associated with the apparatus 3. It is important to note that the cleat 22 can be designed to be flush with the boat skin, trailer bed, or the truck bed so as to reduce the potential for injuries and damage to the apparatus 3. It should be recognized the cleat 22 can also be mounted separate from the housing 3. As illustrated, one cleat 22 embodiment has substantially a shape of three interconnected pie shapes of unequal size. However, the cleat 22 can have any variety of conventional cleat shapes or modified cleat shapes. It should be appreciated that the primary function of the cleat is to provide a convenient tie down location to help maintain the extended rope in a static position. The cleat 22 can be attached to the top of the housing 3 thru attachment holes 23. It should be understood that the number of attachment points 23 can vary depending on the size of the cleat, the size of the rope or cable 7, and the load to be restrained. The method of attachment can comprise a variety of conventional methods, including but not limited to bolts, screws, rivets, welds, snaps, pins, and the like. Further, the cleat 22 can have at least two grooves 27 which allow for the treading of the rope or cable 7 to allow the rope or cable 7 to be locked into place. It should be appreciated that the number of grooves 27 can vary depending upon the type of cleat, the load to be held, the size of the cable or rope 7, and the like. FIG. 4 also illustrates a ball 21 positioned at one end of the rope 7. The ball 21 can serve to prevent the end of the rope 7 from being retrieved fully into the housing 3 and to provide a convenient grip or catch for the rope 7. The cleat 22 can be used in combination with a dock cleat (6, FIG. 1B) or another separate cleat mounted on a truck or trailer. Further, it is envisioned that a cleat 22 can comprise a locking device, separate from the tying of the rope 7. The locking device can be a face plate that turns to lock or tighten the rope 7.

Figure 5:
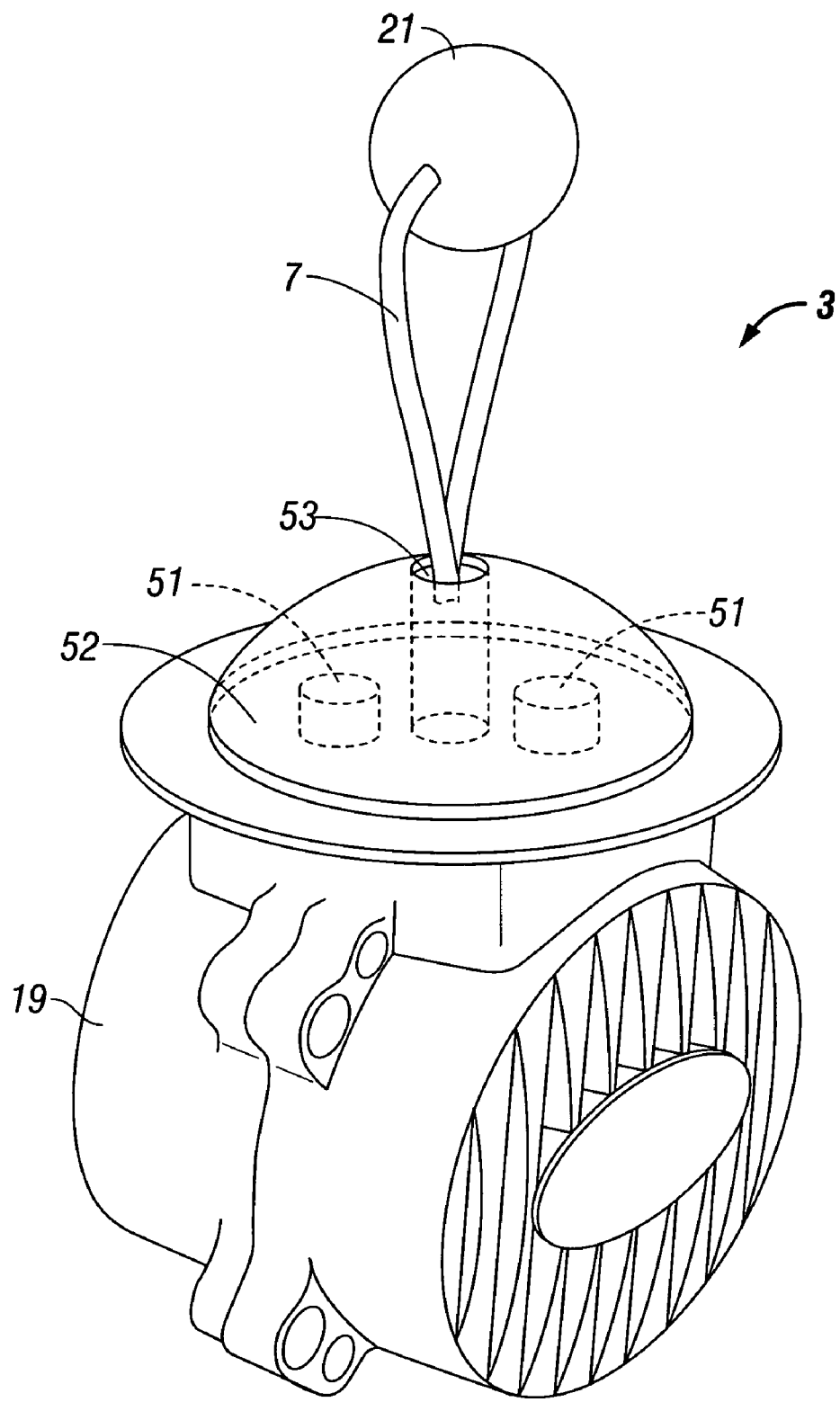
FIG. 5 illustrates an embodiment of the apparatus including lamps in accordance with the present invention.

FIG. 5 illustrates one non-limiting embodiment where the cleat 22 can be replaced with a dome 52. As will be discussed in greater detail the dome 52 can be several configurations for several different purposes. In one configuration the dome 52 comprises transparent or a semi-transparent material in order to house lamps 51. In other embodiments the dome 52 can comprise a metallic orb for substantially flush mounting this a boat deck or a dock. In yet another embodiment, the dome 52 can be a substantially a metallic orb for substantially flush mounting on a boat deck or a dock with grooves which can serve as a allow the orb to function as a cleat. A central aperture 53 in the dome provides a path for the ropes 7 from the housing 3. Like the cleat 22, the dome 52 can be attached by a number of fasteners known to those in the art, such as bolts, screws, or other threaded engagements. The lamps 51 can be powered by a number of conventional power sources (not pictured). A power source such as a battery can be secured within the dome 52 accompanying the lamps 51. The anchoring system can also be configured to receive power from external sources such as, but not limited to, a boats battery or a source of power from a marina where the boat is docked. The lamps 51 can be controlled by a conventional on/off switch or they can power on when the vehicle is turned on. The lamps can be various lights including but not limited to: incandescent bulbs; LEDs; and halogen lamps. Incandescent lights can be powered by a 12V system. It should be noted the appearance of the dome 52 can vary with the type of lamp chosen. While FIG. 5 illustrates a dome dimensioned to hold incandescent bulbs, a dome can just as easily be configured to hold LEDs. A dome containing LEDs can protrude slightly, but maintain a nearly flush profile.

The lamps serve a variety of purposes. The lamps potentially serve as ornamental decorations as well as safety lights. When visibility on the deck is low, such as at night or bad weather, these lamps bring attention to the ropes 7 originating on the deck of a boat. This extra illumination helps prevent passengers or personnel from tripping on the ropes 7. The lamps can aid in navigation of the watercraft, by providing a reference for the orientation of said watercraft.

Figure 6:
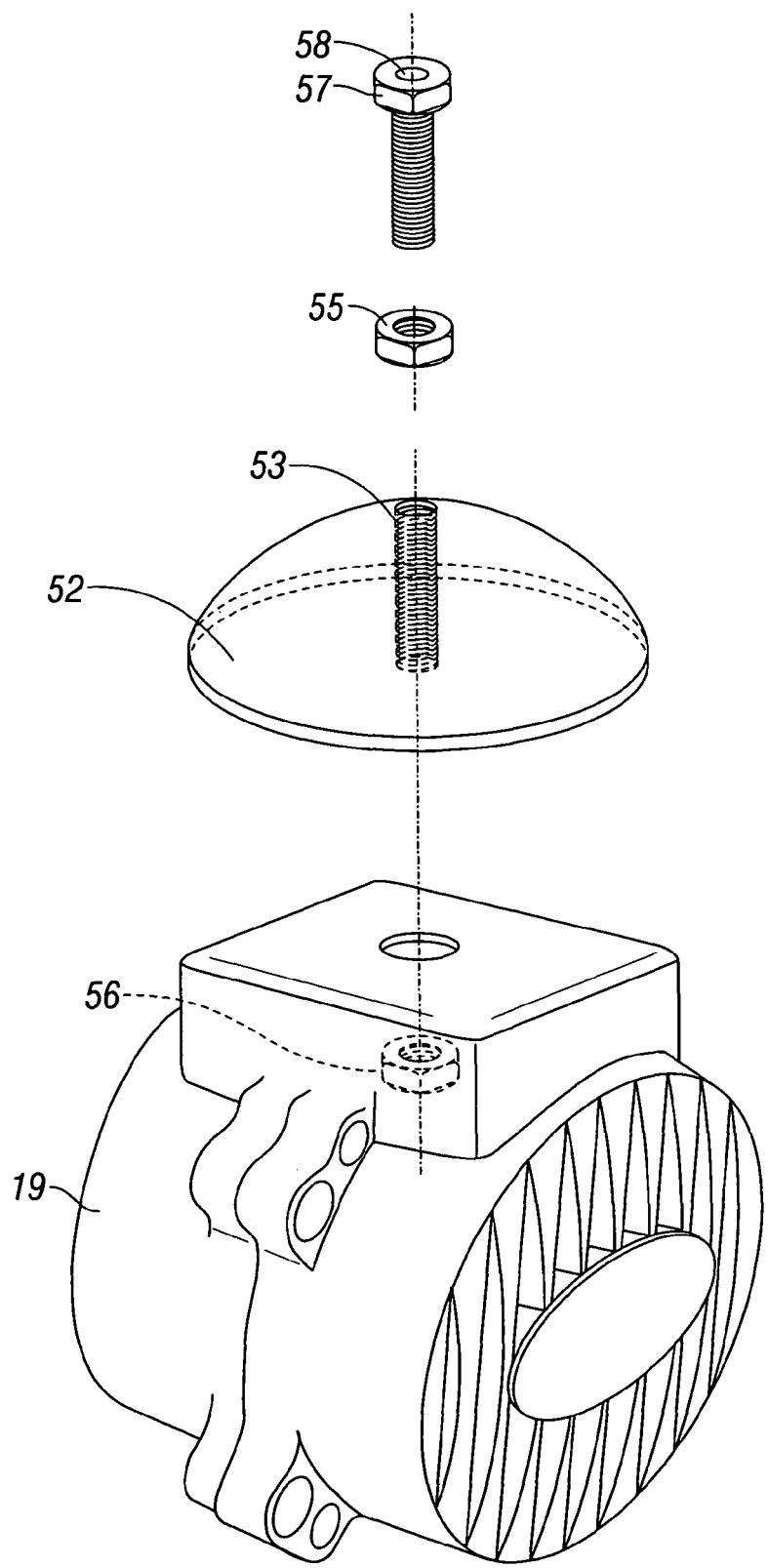
FIG. 6 illustrates an embodiment of the apparatus including bolt with a hollow shaft for securing to the housing in accordance with the present invention.

FIG. 6 illustrates one non-limiting embodiment of the dome 52 where the holes 23 are replaced with central aperture 53 secured which secures a hollow shaft bolt 57. The hollow shaft bolt 57 has a threaded exterior like a normal fastener, but also contains a through hole 58 down the entire axis of the bolt. The hollow shaft bolt 57 can secure the cleat 22 or dome 52 to the housing 3 and allows rope or cable 7 to pass from the interior or the housing to the exterior of the housing.

FIG. 6 illustrates a dome 52 secured to the housing 3 with the hollow shaft bolt 57, but one of ordinary skill in the art would understand a shorter hollow bolt screw 57 could be used to secure the flatter cleat 22, like those depicted in FIG. 3 and FIG. 4. The through hole 58 provides a path for the rope or cable 7 from the interior of the housing 3. The central aperture 53 in the dome 52 can be threaded in order to secure the threaded hollow shaft bolt 57. The aperture in the housing 3 can also be threaded to secure the hollow shaft bolt 57. FIG. 6 illustrates securing nuts 55 and 56 placed above the dome 52 and inside the housing 3 just beneath the central aperture 53. One of ordinary skill in the art would appreciate several configurations for securing the dome 52 to the housing 3 and FIG. 6 depicts one of these configurations. For example, the treading could be omitted from the dome and housing in the presence of two nuts and the hollow shaft bolt.

Figure 7:
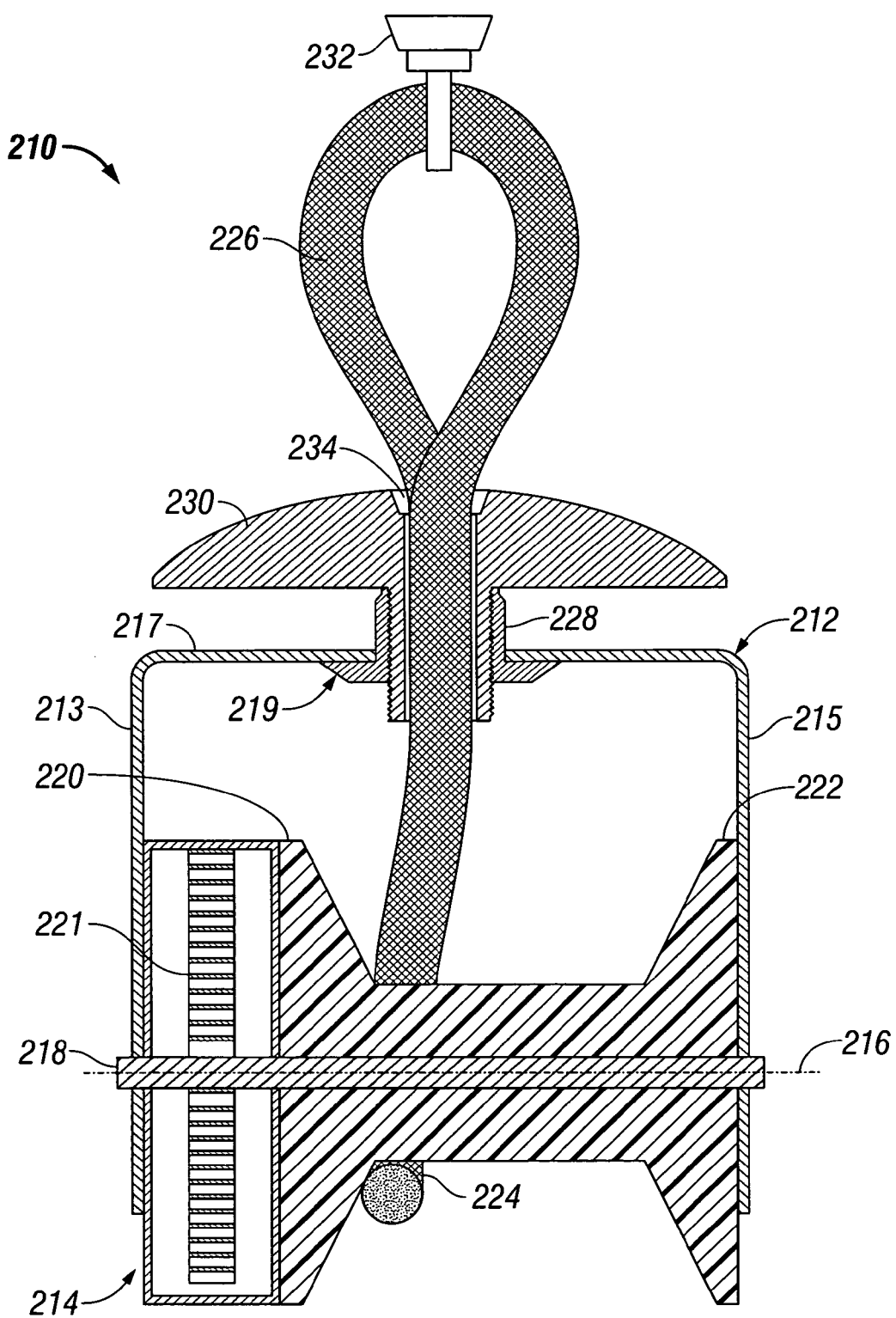
FIG. 7 illustrates an embodiment of the anchoring unit with a retractable rope or cable in accordance with the present invention.

FIG. 7 illustrates one embodiment of an anchoring unit 210. This embodiment of the anchoring unit 210 serves any number of purposes previously described, such as anchoring vehicles cargo or personnel. The unit 210 can be installed on any number of vehicles including watercraft, automobiles, and space craft. The housing 212 provides a surface for mounting the anchoring unit 210 in vehicles or on docks or other surfaces. The housing 212 secures a spool 214 about an axis 216 so the spool 214 is free to rotate. In the embodiment illustrated in FIG. 7 the housing 212 comprises a first wall 213 and a second wall 215 generally parallel to each other defining sides of the housing. A third wall 217 connects walls 213 and 215 and defines a top surface of the housing 212. A receiving member 219 can be mounted with the third wall 217 and protrude through the third wall 217 with a threaded central passage. However, in alternative embodiments many spool configurations are readily apparent and within the spirit of the present invention. For example, the housing 212 can comprise two sides independently mounted or a plurality of surfaces substantially enclosing the spool 214.

Like FIG. 2A, the axis 216 can comprise an elongate member 218 such as a screw, bolt, rod or shaft pin extending the length of the spool 214. In one embodiment the elongate member 218 is secured through holes in the housing 212. The elongate member serves as an axis about which the spool 214 is free to rotate. The elongate member 218 can be secured to the housing in a manner that prevents axial displacement of the elongate member 218 as well as rotation of the member 218. Like FIG. 2 a split in one end of the elongate member serves as a means for securing one end of the internal clock spring.

In an alternative embodiment the spool 214 can also be secured about the axis 216 by a split axle type configuration. In the split axle configuration, the housing 212 would provide at least two opposing protrusions. Each protrusion would be mated to, or paired with, holes in the sides of the spool 214. The protrusions and holes would be dimensioned for a tight fit and to allowing the spool to rotate about an axis 216 created by the pair or protrusions. One of ordinary skill in the art can appreciate other configurations for mounting a spool 214 to rotate relative to a housing 212 encompassed within the claims of this invention.

FIG. 7A illustrates a first ridge 220 defining a first guide and a second ridge 222 defining a second guide for ensuring rope or cable 224 is wound about the spool 214. One end of the rope or cable 224 is attached to the spool 214 and the other end is formed into a loop 226. FIG. 7A illustrates a rope 224 wound about the spool 214 and partially withdrawn through a neck 228 as well as through a removable top piece 230. The neck 228 is the portion of the receiving member 219 which extends through the housing 212. Much like the hollow bolt discussed with respect to FIG. 6 the neck 228 provides a passage for the rope or cable 224 to pass from the spool 214 to the exterior of the housing 212. FIG. 7A more clearly illustrates the rope 224 passing from the spool 214, through the housing 212 via the receiving member 219, and the neck 228 as well as through the top piece 230. Typically, the housing 212 will be mounted beneath a surface, such as a boat deck or a dock, with the neck 228 extending through a hole in the surface. In one embodiment this hole can be ⅜ inch in diameter. In this way, the rope or cable 224 is stored beneath the surface but reaches the surface through the neck 228.

In one embodiment, the neck 228 and the loop 226 are configured such that the loop 226 can be retracted within the housing 212. This can be accomplished by splicing or weaving the loop 226 into the rope or cable 224. In one embodiment the loop 226 is placed at the end the rope 224, so the first length of rope 224 extended through the neck 228 of the anchoring unit is the loop 226. In alternative embodiments the loop 226 can be located other positions in the rope 224. In another embodiment the loop 226 can be formed by a knot in the rope or cable 224. The size of the knot can be such that it will not pass into the housing. In this embodiment, the knot provides a stop which leaves the loop portion fully. In this way, the majority of the rope or cable 224 can be stored on the spool 214, while the loop remains stored external to the housing allowing easy access to retract a length of rope or cable 7. The removable top piece 230 can be flat or slightly curved, and can included a threaded stem for mating to into threads contained with in the neck 228 of the housing 212.

The removable top piece 230 serves to create a flush surface with the deck of the boat, the dock, or any other surface where the anchoring unit 210 can be mounted. The top piece 230 illustrated in FIG. 7A can be replaced by the dome 52 illustrated FIG. 5 in order to provide lights for safety or navigation or decoration. The top piece 230 can also be replaced with or formed into a cleat like that illustrated with respect to FIG. 4. Each of theses pieces serve to prevent the neck 228 from presenting a hazardous protrusion on the surface of a boat, a dock, or any other surface. The top piece 230 illustrated in FIG. 7A represents a generic flush piece for this purpose. These other pieces described with respect to FIGS. 5 and 6 provide additional advantages and anyone of them could be used with any embodiment of the anchoring unit 210. For example, it can be desirable to have the dome 52 with LEDs to assist personnel in finding the anchoring units when viability is low or after dark. It can be desirable to provide the anchoring unit with substantially flush cleats 22.

A button 232 is attached at some point on the loop 226. The button 232 is designed to have a radius greater than any through hole provided in removable top piece 230 or the neck 228 in order to prevent the rope 224 from completely retracting within the housing 212. The stop button 232 also serves as a grip for withdrawing rope or cable 224 from the housing 212. The rotation of the spool 214 tends to wind the rope or cable 224, including a portion of the loop 226, around the spool 214 while the stop bottom remains exposed for easy access to the coiled length of rope or cable. In one embodiment the top piece 230 contains a recess 234 for receiving at least a portion of the button 232.

When the anchoring unit 210 is placed in a boat, for example, installation would require a single hole in the fiberglass surface in order to accommodate the neck 228. The housing 212 would be secured beneath the fiberglass surface and the removable top piece would be attached above the fiberglass surface. Rope or cable 224 would be unwound from the spool 214 pass through the neck 228 and be available for attachment to a dock or cleat. In one embodiment the removable top piece 230 has grooves sized for receiving and retaining the rope or cable 224 stored on the spool. In this configuration the removable top piece 230 also serves as a cleat.

FIG. 7A illustrates one embodiment of the second end of the rope or cable 7 formed into a loop 226. One loop 226 marketed under LAZERLOOP™ (trademark owned by Lazerrope Docking Systems) provides a fast and convenient means for attaching the rope or cable 224 to a second location, such as a cleat on dock. The LAZERLOOP™ can be a loop 226 at one end of the rope or cable 224 wherein the end is substantially woven or spliced back into a portion of the rope or cable 224 creating a secure and strong loop in the rope or cable. It should be understood that those skilled in the art can make the LAZERLOOP™ by interconnecting the rope in a variety of ways including, but not limited to various weaves, splices, knots, clamps, pins, shackles, melting, welding, brazing and the like. The dimensions of the loop 224 can be predetermined based on the use of the anchoring system. By way of one non-limiting example, when the anchoring system 210 is used to secure a boat to a dock, the loop 226 will be dimensioned to easily slip over a standard cleat in the boating industry. The loop 226 provided herein provides in conjunction with the disclosed anchoring system provides advantages not seen in the prior art. The rope or cable 226 is configured such that a portion of the loop 226 can actually be stored around the spool 212. In this configuration only a minimum amount of rope or cable 224 is stored outside the anchoring unit 210. Additionally, the loop of the present invention is dimensioned so that a portion of the rope or cable 224 can be pulled through the loop in order to form a "lasso." This lasso or second loop can be expanded to a circumference nearly the length of the entire rope or cable 224. Further, the retracting bias of the apparatus as disclosed will serve "tighten" the "lasso" by tensioning the rope or cable and retracting any slack in the rope or cable 224. In this way, the loop 224 disclosed in connection with this embodiment can be slipped over objects of almost any size and will tighten around these objects. In one embodiment the loop 226 will be located at the end of the rope or cable 224. However, in another embodiment the loop 226 can be formed in any portion of the rope or cable 224 between the two ends of the rope or cable 224.

Figure 8:
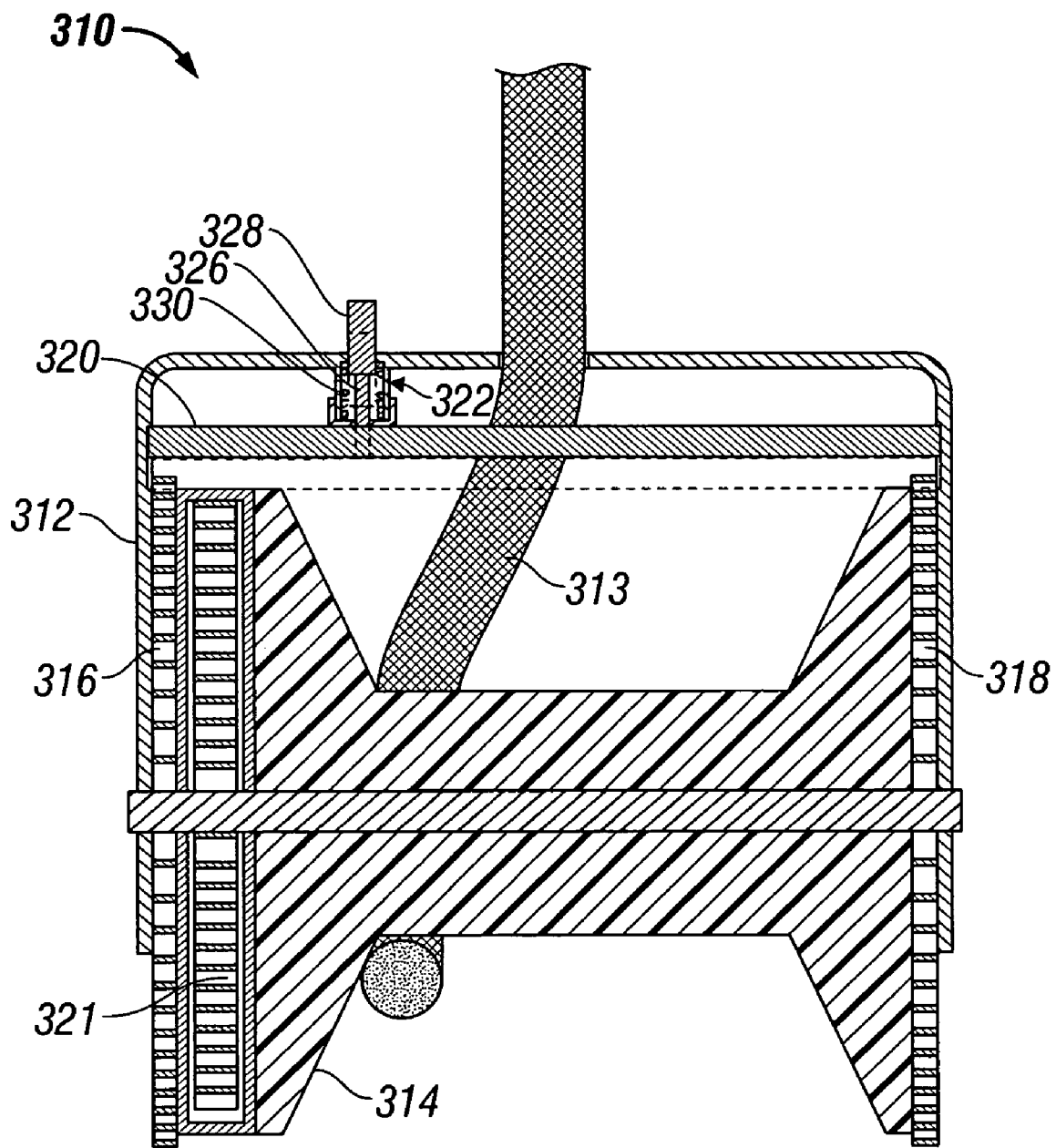
FIG. 8 illustrates an embodiment of the anchoring unit with a retractable rope or cable in accordance with the present invention.

FIG. 8 illustrates an embodiment of the present invention where a desired amount of rope or cable 313 can be withdrawn and locked out. This embodiment can be particularly beneficial for securing cargo in the bed of a truck such as illustrated in FIG. 1L. This embodiment provides a desired length of rope or cable 313 without any force tending to retract said length of rope or cable 313. The retractable mechanism of this embodiment works in much the same manner as previously described with respect to FIGS. 2 and 7. An anchoring unit 310 is affixed to some location, like the corner or bed of a truck, by its housing 312. A spool 314 is disposed to rotate about an axis within the housing 312, and is biased to wind a length of rope or cable 313 about the spool 314 by the same mechanisms previously described. Additionally, just outside the spool 314 the anchoring unit 310 contains at least a first gear element 316 and in one embodiment a first gear element 316 and second gear element 318 mounted to rotate with the spool 314.

A blade 320 is illustrated above the first gear element 316 and the second gear element 318, but can be located in various positions around the gears so long the blade 320 is configured to engage both gears in a uniform fashion. Blade 320 actuates between a first position and a second position. In one position the blade 320 does not contact any portion of the spool 314, the first gear 316, or the second gear 318. In this position the anchoring unit 310 operates as previously described with respect to FIGS. 2 and 7. In the second position the blade 320 is moved into contact with the first gear 316 and the second gear 318. The blade 320 prevents both the first gear 316 and the second gear 318 from rotating, and by their rigid attachment to the spool 314 they prevent the spool from rotating 314. By preventing the spool 314 from turning the biasing force provided by the anchoring unit 310 to retract the rope or cable 313 has been counteracted leaving the desired length of rope of cable 313 dispensed. The blade 320 can be actuated between its first and second position in a number of ways. FIG. 8 illustrates a push button configuration 322, where a spring 326 biases the blade 320 into its first position. The blade 320 is connected to the button 328 by a stem 330. The push button configuration 322 operates in much the same way as a push button pen. A first push locks the button 328 in its first position against the force of the spring 326. A subsequent push unlocks the button and the force of the spring. In this position the biasing force of the spring is overcome and the stem 330 and the blade 320 are pushed downward putting the blade 320 in its first position where a first push over comes the spring and sets the blade in a second position. An additional push Other configurations are envisioned, for example a configuration where a spring biases the blade 320 into its second position and some mechanical means is incorporated to move the blade into its second position.

The operation of this embodiment includes withdrawing some length of rope or cable 313 from the anchoring unit 310. Once the desired length of rope or cable 313 has been withdrawn, the button 328 is depressed to move the blade 320 into its second position where it engages the first gear 316 and the second gear 318 to prevent further rotation of the spool 314. In this position the blade 320 locks the spool 314 from retracting the rope or cable 313 as it is biased to do. This embodiment provides an apparatus for withdrawing a desired length of rope or cable 313, where the rope or cable 313 can be kept in tension as provided by the anchoring unit 310, or the tension provided by the anchoring unit can be eliminated by actuating the blade 320 into its second position.

It may be seen from the preceding description that a new and improved system and method for docking, roping, anchoring, and mooring has been provided. Although very specific examples have been described and disclosed, the embodiment of one form of the apparatus of the instant application is considered to comprise and is intended to comprise any equivalent structure and can be constructed in many different ways to function and operate in the general manner as explained hereinbefore. Although the embodiments described herein operate on principles of mechanical springs, any type of electrical or mechanical crank backups are fully contemplated herein and should not be viewed as a limitation thereof. Accordingly, it is noted that the embodiment of the new and improved system and method described herein in detail for exemplary purposes is of course subject to many different variations in structure, design, application, form, embodiment and methodology. Because many varying and different embodiments can be made within the scope of the inventive concept(s) herein taught, and because many modifications can be made in the embodiments herein detailed in accordance with the descriptive requirements of the law, it is to be understood that the details herein are to be interpreted as illustrative and not in a limiting sense.

What is claimed is:

1. An apparatus comprising:
  a housing;
  a spool with an axis partially enclosed within the housing, wherein the spool is mounted to rotate about the axis;
  the spool having a first ridge defining a first guide; a second ridge defining a second guide; and a core disposed between the first ridge and the second ridge, wherein the first ridge is hollow;
  a rope having first and second ends connected to the spool at the first end, wherein a portion of the rope is formed into a loop, wherein the loop is configured for slipping over boat cleats or dock cleats, and wherein the rope is wound about the spool;

a spring configured to bias the rotation of the spool to resist the unwinding of the rope from the spool and to urge rewinding of rope previously unwound from the spool;

at least a first member attached for rotation with the spool, wherein the first member comprises teeth or ridges; and a stop member with at least two positions, wherein in a first position the bar or blade engages the teeth or ridges of the first member and impedes the member and the spool from rotating, and wherein in a second position the blade or bar does not impede the rotation of the first member or the spool.

2. The apparatus of claim 1 wherein the spool is configured to rotate about a shaft and the spring is placed inside the first hollow ridge of the spool for attachment to both the spool and the shaft.

3. The apparatus of claim 1 wherein at least a portion of the loop formed in the rope is wound around the spool due to the biased rotation of the spool.

4. The apparatus of claim 1 further comprising:
an aperture through the housing;
a threaded retaining member with a central passage disposed through the aperture of the housing;
a top piece comprising a threaded neck and a radially extending surface with a passage therethough, wherein the neck of the top piece is threaded into the retaining member, and wherein a portion of the rope passes through the neck and the retaining member to the exterior of the housing; and
a button mounted with the loop of the rope or cable wherein the at least a portion of the button remains above the top piece to prevent retraction of the entire length of rope with in the housing.

5. The apparatus of claim 4, wherein the top piece is substantially rounded to form a flush surface, wherein the button is configured to rest substantially flush with the top piece, and wherein the top piece includes at lease one grove at the aperture of the top piece configured for grabbing the end of the button.

6. The apparatus of claim 1 wherein a portion of the rope is passed through the loop forming a second loop and the tension created by the biased rotation of the spool tightening the second loop around a desired object.

7. The apparatus of claim 6 wherein the size of the second loop ranges from about the thickness of the rope or cable to about the length of the rope or cable.

8. The apparatus of claim 1 further comprising a removable top piece with an aperture through which a portion of the rope passes.

9. The apparatus of claim 8 wherein the removable top piece contains at least one grove, wherein the at least one groove extends the thickness of the plate forming a cleat for securing a portion of the rope.

10. The apparatus of claim 1 wherein a button is mounted with the loop of the rope, the button having an outer diameter greater than the outer diameter of the aperture in the housing.

11. The apparatus of claim 8 wherein the removable top piece comprises at least one cavity with a lamp disposed therein.

12. The apparatus of claim 11 wherein the lamp is an LED.

13. The apparatus of claim 8 wherein the removable top piece is secured to the housing by a hollow threaded bolt having a cavity running along the entire axis of the bolt so the rope or cable secured to the spool passes through the hollow bolt.

14. A method of securing an object comprising the steps of:
mounting a spool having first and second ridges with a housing, so the spool is free to rotate relative to the housing, wherein at least a first member comprising teeth or ridges is attached for rotation with the spool, and wherein a stop member comprises a bar or a blade in a first position configured to engage the teeth or ridges of the first member and impedes the member and the spool from rotating, and the stop member further comprises a second position whereby the blade or the bar do not impede the rotation of the first member or the spool;
biasing the spool to rotate in a single direction by connecting a spring within one of the ridges in the spool;
connecting a rope to the spool, so the biased rotation of the spool will wind the rope about a portion of the spool between the first and second ridges of the spool;
mounting the housing at a desired location;
unwinding a length of rope or cable from the spool; and
securing the rope or cable to a second location.

15. The method according to claim 14, wherein the step of securing the rope or cable to a second location includes passing a portion of the rope or cable through a loop formed on the end of the rope or cable to form a second loop and placing the second loop around an object at the second location, wherein the tension created by the bias of the spring tightens the second loop around the second location.

16. The method according to claim 14 wherein the desired location is either on a dock for docking a watercraft or wherein the desired location is on a watercraft for docking the watercraft, or wherein the desired location is on a watercraft for securing a bumper over the edge of the watercraft, or wherein the desired location is on truck bed for securing objects in or on a truck bed.

17. The method according to claim 14 wherein the desired location is on spacecraft for securing an astronaut or an object to the spacecraft.

18. The method according to claim 14 wherein the step of securing the rope or cable to a second location comprises sliding a loop formed at the second end of the rope over a cleat secured to a dock.

19. An apparatus for anchoring an object comprising:
a housing;
a spool mounted with the housing to rotate relative to the housing;
a rope having first and second ends connected to the spool at the first end, wherein the rope is wound about the spool;
a spring configured to bias the rotation of the spool to resist the unwinding of the rope from the spool and to urge the rewinding of rope previously unwound from the spool;
at least a first member mounted for rotation with the spool, wherein the first member comprises teeth or ridges; and
a bar or blade mounted with the housing and having at least two positions, wherein in a first position the bar or blade engages the teeth or ridges of the first member and impedes the member and the spool from rotating, and wherein in a second position the blade or bar does not impede the rotation of the first member or the spool.

20. The apparatus according to claim 19 further comprising:
a stop button or plug mounted with the loop, wherein the loop or cable is at least partially stored wrapped around the spool, and the stop button or plug prevents the loop from retracting completely within the housing.

21. An apparatus comprising:
a housing having a first wall, a second wall, and third wall, wherein the first wall and the second wall are generally parallel to each other and generally perpendicular to the third wall which is connected therebetween generally forming a U shape housing, wherein retaining member with a threaded opening is mounted with the third wall has an opening;

openings in the first and second wall;

a shaft pin mounted with the openings in the first and second walls;

a spool mounted within the housing to rotate about the shaft pin;

the spool having a first ridge defining a first guide; a second ridge defining a second guide; and a core disposed between the first ridge and the second ridge, wherein the first ridge has an interior cavity;

a rope having first and second ends connected to the spool at the first end, wherein a portion of the rope is formed into a loop, and wherein at least a portion of the rope passes through the opening in the third wall from the spool to the exterior of the housing;

a spring located within the interior cavity of the first ridge and connected to the shaft pin as well as the spool, wherein the rope is wound about the spool and the spring is biased to resist unwinding of the rope and to urge the rewinding of rope that has been previously unwound from the spool;

a top plate with a threaded neck extending therefrom and a central opening passing through the neck and the plate, wherein the threaded neck is threadably engaged with the retaining member, wherein at least a portion of the rope passes through the threaded neck and the top plate to the exterior of the housing, wherein the top plate further comprises grooves;

a button mounted with the loop of the rope outside the housing and the top plate, wherein the diameter of at least a portion of the button is larger than the diameter of the central opening passing through the neck and the plate to prevent the button from being retracted therethrough, wherein the button retracts partially within the top plate and rests substantially flush with a surface of the top plate.

* * * * *